United States Patent [19]
Onishi et al.

[11] Patent Number: 6,147,972
[45] Date of Patent: Nov. 14, 2000

[54] METHOD AND SYSTEM FOR ACHIEVING CELL DIAGNOSIS OF CONTINUITY IN CELL EXCHANGE

[75] Inventors: Kazuei Onishi; Masatoshi Takita, both of Kawasaki, Japan

[73] Assignee: Fujitsu Limited, Kawasaki, Japan

[21] Appl. No.: 09/025,022

[22] Filed: Feb. 17, 1998

[30] Foreign Application Priority Data

Jun. 20, 1997 [JP] Japan ................................. 9-164412

[51] Int. Cl.[7] .......................... G06F 11/00; H04M 1/24; H04L 12/56
[52] U.S. Cl. ........................ 370/248; 370/249; 370/250; 370/395; 379/5
[58] Field of Search ..................... 370/241, 248, 370/249, 250, 351, 395; 714/25, 30, 712, 716, 717; 379/2, 5, 26

[56] References Cited

U.S. PATENT DOCUMENTS 4,168,402  9/1979  Rigden .......................................... 379/5
5,737,338  4/1998  Eguchi et al. .......................... 370/249
5,954,829  9/1999  McLain, Jr. et al. .................... 714/712

FOREIGN PATENT DOCUMENTS 07030552  1/1995  Japan .
08204720  8/1996  Japan .

*Primary Examiner*—Alpus H. Hsu
*Assistant Examiner*—Afsar M. Qureshi
*Attorney, Agent, or Firm*—Helfgott & Karas, PC.

[57] ABSTRACT

In a cell exchange, cell diagnosis of continuity with respect to an individual part operating in a band width for a speed faster than a cell feeding speed is enabled by using cell test equipment with a low cell feeding speed. The method of cell diagnosis of continuity for this purpose comprises a step of setting a plurality of paths between a diagnosed unit to which the cell diagnosis of continuity is applied and the cell test equipment; a step of almost substantially concentrating cells sent from the cell test equipment through a plurality of paths at the diagnosed unit; and a step of returning cells concentrated at the diagnosed unit to the cell test equipment via one of a plurality of paths.

17 Claims, 30 Drawing Sheets

Fig.25

| ITEM | LOCATION TO BE SWITCHED | VALUE OF TAG |
|---|---|---|
| 1 | AIFSH UPWARD INPUT | TAG-E |
| 2 | CRSWSH 1st | TAG-A1 |
| 3 | CRSWSH 2nd | TAG-A2 |
| 4 | CRSWSH 3rd | TAG-A3 |
| 5 | AIFSH DOWNWARD OUTPUT | TAG-B |

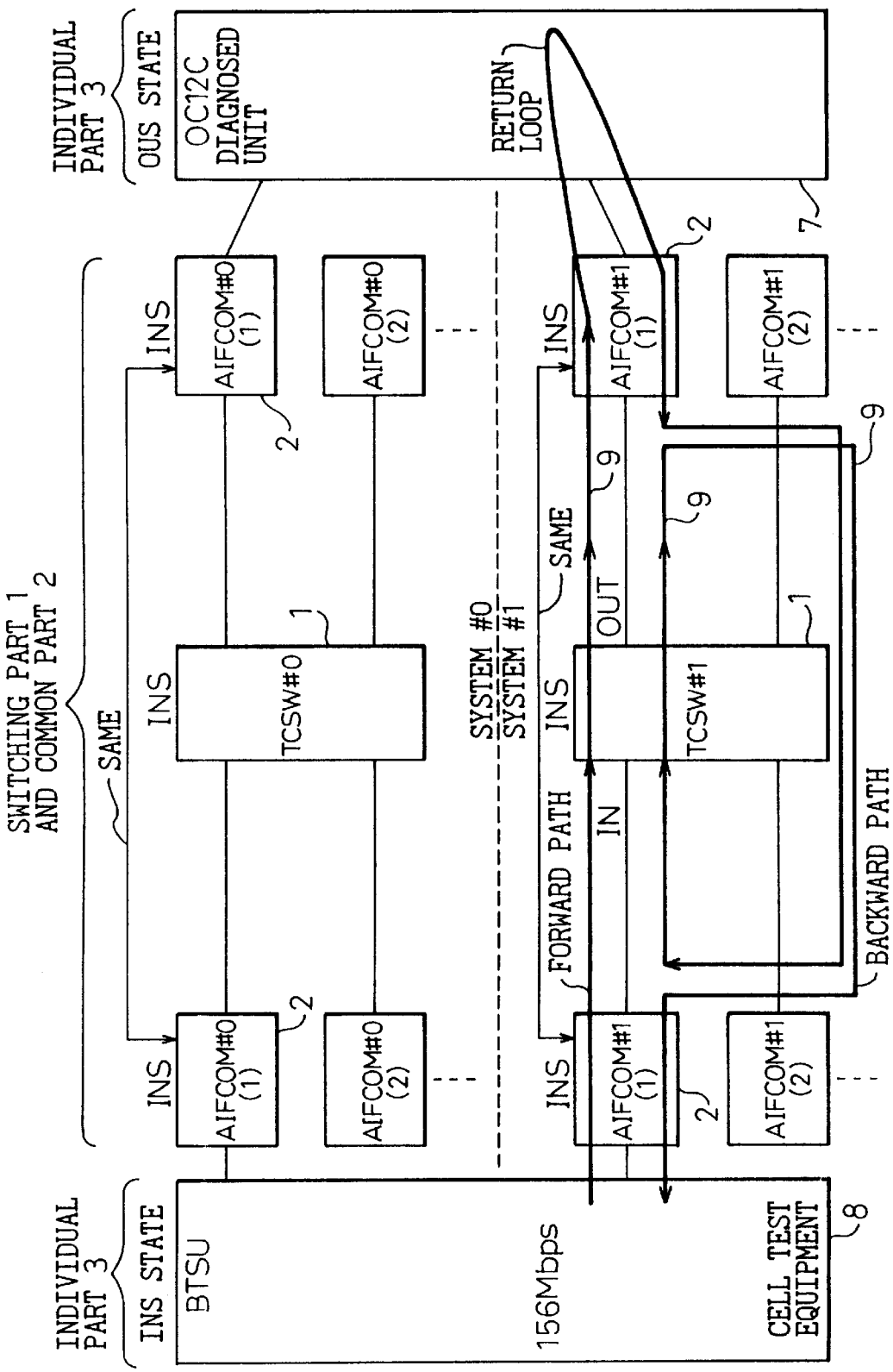

METHOD AND SYSTEM FOR ACHIEVING CELL DIAGNOSIS OF CONTINUITY IN CELL EXCHANGE

BACKGROUND OF THE INVENTION

1. Field of the Invention

The present invention relates to a system for achieving cell diagnosis of continuity in a cell exchange, for example, a system for achieving cell diagnosis of continuity suitable for application to a speech path (SP) side apparatus in for example a broad band asynchronous transfer mode (ATM) cell exchange.

An ATM cell exchange individually adds designation information (header information) to fixed length packets referred to as "cells" and performs switching processing by having these cells perform self routing. In recent years, there has been a growing demand for broad band ATM cell exchanges of the order of a few hundreds Mbps or more so as to handle multimedia transmissions.

Such an ATM cell exchange performs self-diagnosis in order to ensure the normality of this ATM cell exchange itself. This self diagnosis is mainly carried out by using microprocessors mounted for every functional block of this ATM cell exchange and detecting existence of hardware failures.

However, it is difficult to ensure normality with a further higher reliability by only this self diagnosis. For this reason, it is required to check for the occurrence of abnormalities such as loss of cells or duplication of cells by actually sending cells into the ATM cell exchange, particularly into the SP side apparatus. The diagnosis for this check is called the "cell diagnosis of continuity". The present invention will describe a method for cell diagnosis of continuity for achieving this.

2. Description of the Related Art

As will be explained in detail later by referring to the drawings, a cell exchange, for example, a broad band ATM cell exchange, is roughly comprised of three types of functional blocks. Namely, it is comprised of a switching part, a common part, and individual parts. Usually a plurality of individual parts (1 to n) are mounted, each of which individual parts functions as an interface with several thousands of subscriber terminals connected under it. A plurality of path routes are set among the switching part, common part, and individual parts through which communication is carried out among a plurality of subscriber terminals.

The means for the above mentioned cell diagnosis of continuity most relevant to the present invention is a cell test equipment explained in detail later. This cell test equipment sends testing cells to predetermined path routes, receives the sent cells, and checks whether or not these cells are normally received. An actual example of this cell testing equipment is a broadband test unit (BTSU).

As will be explained in detail later, a conventional cell testing equipment (BTSU) has a maximum cell feeding speed of for example 156 Mbps. It cannot send testing cells with a cell feeding speed more than this.

In recent years, however, the maximum operating band width of the individual parts has been broadened considerably to deal with the new multimedia age. For example, the maximum operating band width has been broadened so as to increase the speeds handled from the conventional 156 Mbps to 622 Mbps.

This means that the above conventional cell test equipment can no longer perform cell diagnosis of continuity in a broad band ATM cell exchange. In this case, one could conceivably develop a new cell test equipment capable of handling 622 Mbps to enable diagnosis.

However, it was found that considerable technical difficulties were involved in the development of practical cell test equipment able to handle 622 Mbps speeds.

SUMMARY OF THE INVENTION

Accordingly, in consideration with the above problem, an object of the present invention is to provide a method of cell diagnosis of continuity and a system for cell diagnosis of continuity enabling cell diagnosis of continuity in a broad band cell exchange by using a general cell test equipment of the related art as it is.

To attain the above object, the present invention provides a method of diagnosis comprising the step of setting a plurality of paths between a diagnosed unit to which cell diagnosis of continuity is applied and cell test equipment; a step for making cells sent from the cell test equipment via a plurality of paths concentrate almost simultaneously at the cell diagnosed unit; and a step of returning cells concentrated at the diagnosed unit to the cell test equipment via one of the plurality of paths. Thus, in the cell exchange, cell diagnosis of continuity with respect to individual parts operating in band widths handling speeds higher than the cell feeding speed is enabled even if a cell test equipment with a low cell feeding speed is used.

BRIEF DESCRIPTION OF THE DRAWINGS

The above object and features of the present invention will be more apparent from the following description of the preferred embodiments with reference to the accompanying drawings, wherein:

FIG. 25 is a view of a general relationship between a location where cells are switched and the value of TAG;

FIG. 30 is a view of a concrete example of a system for ordinary cell diagnosis of continuity of the related art.

DESCRIPTION OF THE PREFERRED EMBODIMENTS

Before describing the embodiments of the present invention, the related art and the disadvantages therein will be described with reference to the related figures.

Figure 29:
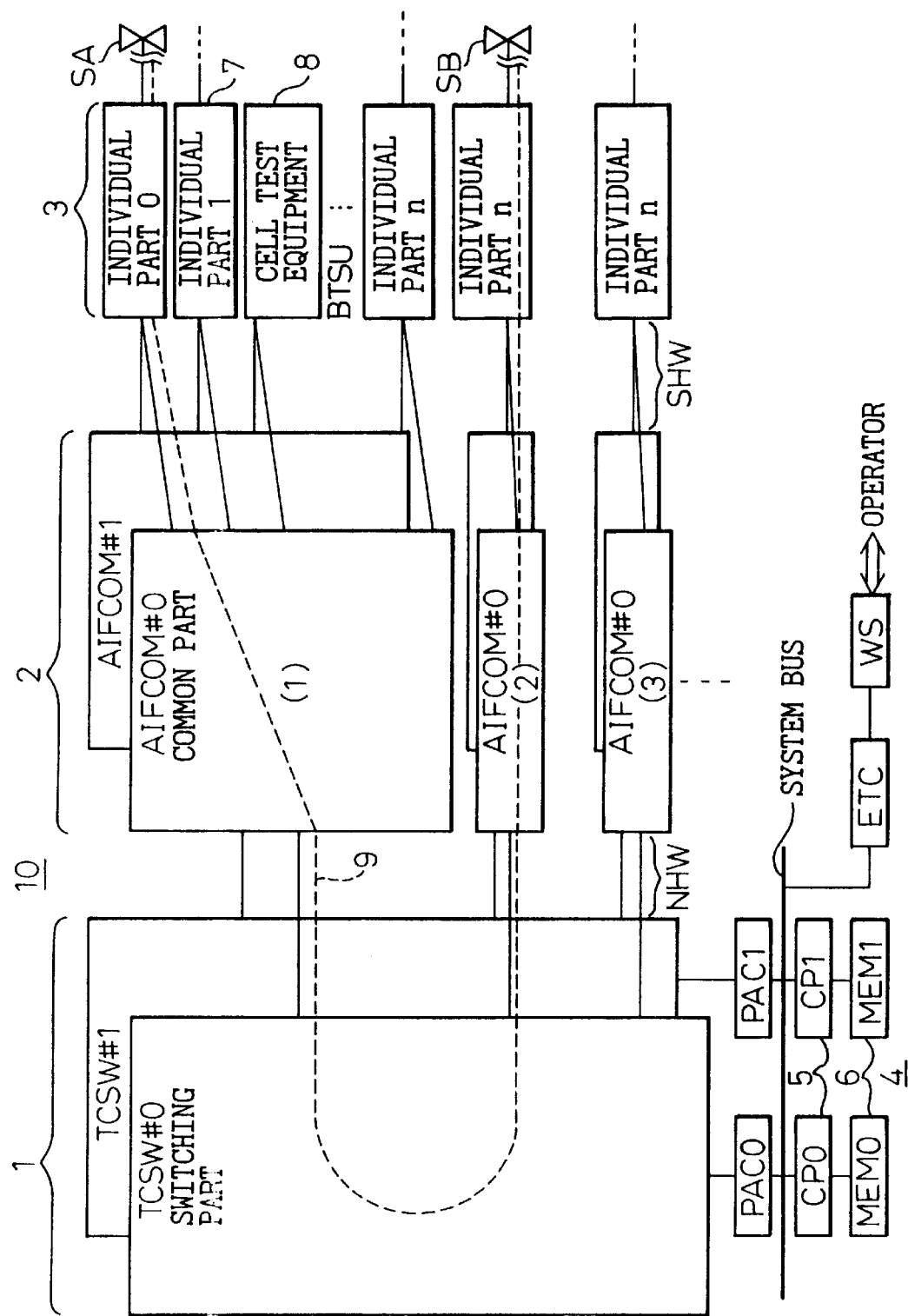
FIG. 29 is a view of an example of an ordinary cell exchange to which the present invention is applied.

FIG. 29 is a view of an example of an ordinary cell exchange to which the present invention is applied.

In the figure, reference numeral 10 is a cell exchange, for example, a broad band ATM cell exchange. The cell exchange 10 roughly comprises three functional blocks, i.e., a switching part 1, a common part 2, and individual parts 3.

The switching part 1 is a network comprised by a large number of self-routing modules. A path for connecting subscriber terminals communicating with each other is formed in this. In the figure, as an example of an actual unit, a terminal connection switch (TCSW) is shown. This has duplex configuration such as the TCSW#0 and #1 illustrated. #0 is a working side, and #1 is a protection side.

As the above subscribers communicating with each other, in the figure, subscriber terminals SA and SB are shown as one example. A path route between them is shown as a dotted line 9.

On the path route 9, the above individual part 3 is provided at the position nearest to the subscriber terminal. Usually a plurality of individual parts 3 (1 to n) are provided, each individual part 3 interfacing with several thousands of subscriber terminals connected under it. An individual part is generally also referred to as a "subscriber card".

The common part 2 is provided between the individual parts 3 and the switching part 1.

This common part 2 has the function of concentrating the large number of path routes 9 connected to the plurality of individual parts 3.

In the figure, as an example of an actual unit of the common part 2, an advanced interface common part (AIFCOM) is shown. This has a duplex configuration such as the illustrated AIFCOM #0 and AIFCOM #1. AIFCOM #0 is the working side, while AIFCOM #1 is the protection side. Further, a plurality of duplexed common parts 2 are provided under the switching part 1. In the figure, for simplification, three common parts are shown, that is, (1), (2), and (3). Note, only one individual part is shown under each of the common parts (2) and (3) for simplification.

The means for cell diagnosis of continuity most relevant to the present invention is illustrated as a cell test equipment 8 in the figure. This cell test equipment 8 sends testing cells to the predetermined path route, receives these sent cells, and checks whether or not these cells are normally received. An example of an actual unit of this cell testing equipment 8 is a broadband test unit (BTSU).

Assume that the individual part 7 in the figure is to be tested. This individual part 7 therefore is the "diagnosed unit" subject to the cell diagnosis of continuity. Below, this will be referred to as the "diagnosed unit 7".

The instruction for executing the test is issued via a maintenance terminal, i.e., a work station WS, and an Ethernet Controller (ETC) by for example an operator in the figure. This instruction is given to a computer 4 via a system bus, whereupon a cell continuity diagnosis program is activated. This program is stored in a memory medium (MEM) 6 and executed by a central processor (CP) 5.

The system bus is connected, as one example, to 0 side and 1 side processor access controllers (PAC), and the switching part 1 and the computer 4 are connected through these.

Note that, in the figure, the switching part 1 and the common part 2 are connected by a plurality of network side highways (NHW). The common part 2 and the individual parts 3 (including the cell test equipment 8) are connected by a plurality of subscriber side highways (SHW).

The cell test equipment (BTSU) 8 of the related art shown in FIG. 29 has a maximum cell feeding speed of for example 156 Mbps. It cannot send testing cells with a cell feeding speed more than this.

In recent years, however, the maximum operating band width of the individual parts 3 has been broadened considerably to deal with the new multimedia age. For example, the maximum operating band width has been broadened so as to increase the speeds handled from the conventional 156 Mbps to 622 Mbps.

This means that the above conventional cell test equipment 8 can no longer perform cell diagnosis of continuity in a broad band ATM cell exchange 10. In this case, one could conceivably develop a new cell test equipment 8 capable of handling 622 Mbps speeds to enable diagnosis.

However, it was found that considerable technical difficulties were involved in the development of practical cell test equipment able to handle 622 Mbps speeds.

Accordingly, in consideration with the above problem, an object of the present invention is to provide a method of cell diagnosis of continuity and a system for cell diagnosis of continuity enabling cell diagnosis of continuity in a broad band cell exchange by using a general cell test equipment of the related art as it is.

Figure 1:
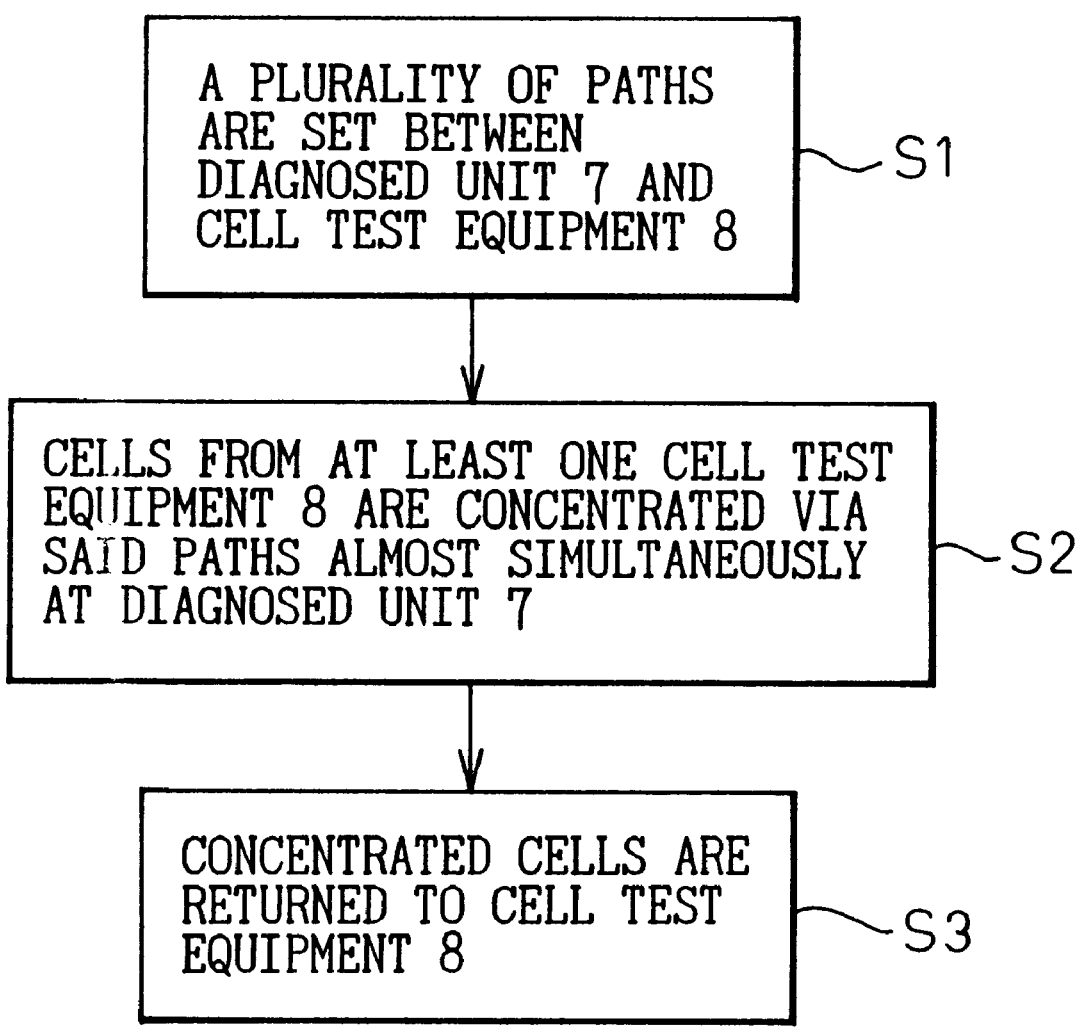
FIG. 1 is a diagram of basic steps of the method of cell diagnosis of continuity according to the present invention.

FIG. 1 is a diagram of basic steps of the method of cell diagnosis of continuity according to the present invention. In this method of cell diagnosis of continuity, the cell test equipment 8 performs a cell diagnosis of continuity with respect to one specified unit (diagnosed unit 7) among the individual parts 3 and other various units constituting the cell exchange 10. This method basically comprises the following three steps.

(i) Step S1

Setting a plurality of paths, in the cell exchange 10, between the diagnosed unit 7 and the cell test equipment 8.

(ii) Step S2

Causing the cells sent from at least one cell test equipment 8 through the plurality of paths to concentrate almost simultaneously at the diagnosed unit 7.

(iii) Step S3

Returning the cells concentrated at the diagnosed unit 7 to the cell test equipment 8 via one of the plurality of paths.

The above method of cell diagnosis of continuity can be realized by the system of first aspect and the system of second aspect of the present invention.

Figure 2:
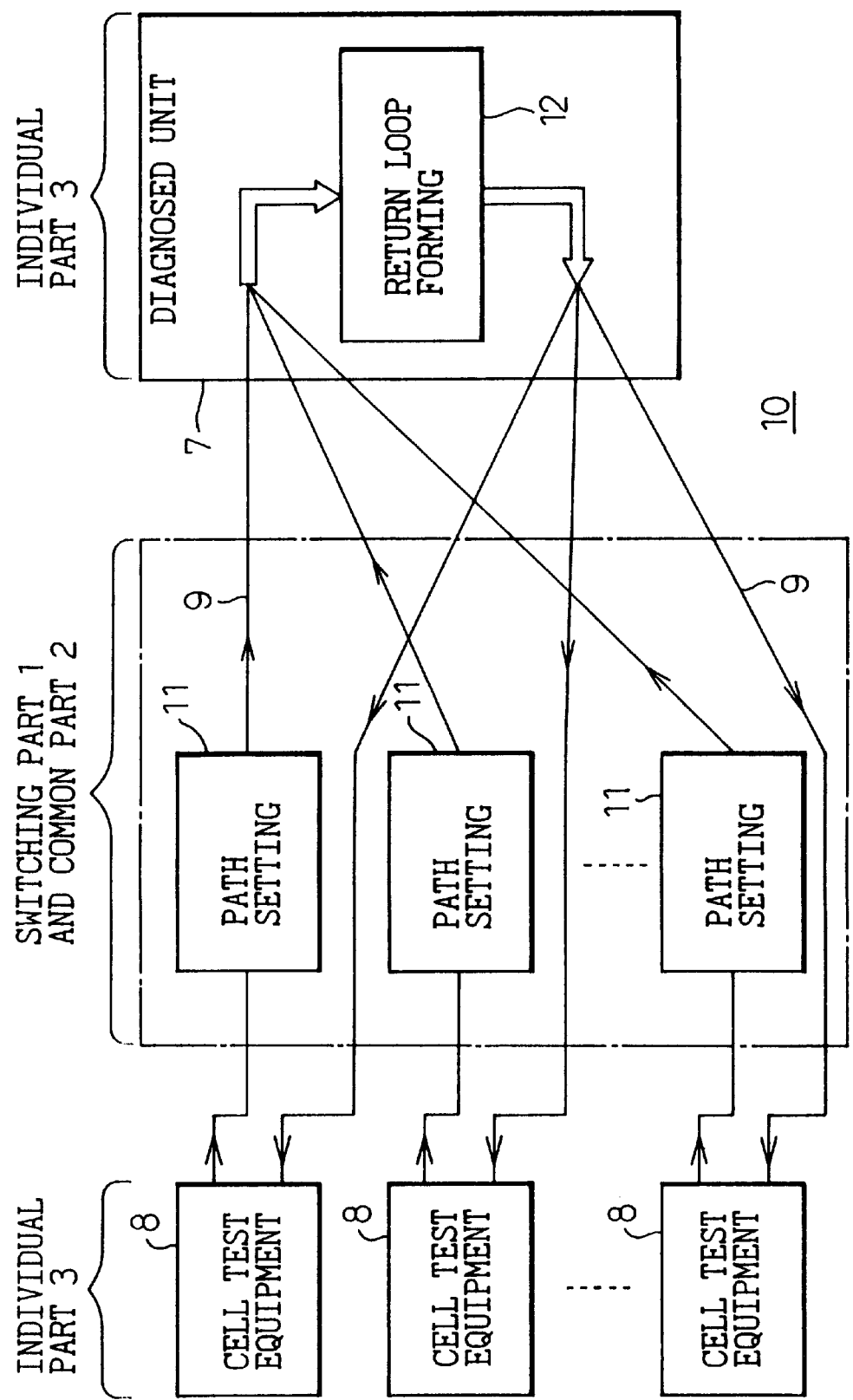
FIG. 2 is a view of a system for achieving cell diagnosis of continuity according to a first aspect of the present invention.

FIG. 2 is a view of the system for achieving cell diagnosis of continuity according to the first aspect of the present invention. It should be noted when viewing the figure that while the diagnosed unit 7 and the cell test equipment 8 are drawn at the left and right in the figure, the diagnosed unit 7 and the cell test equipment 8 are actually located in the same individual part 3 (refer to FIG. 29). They were drawn in this way to facilitate understanding of the routes of the paths connected between the diagnosed unit 7 and the cell test equipment 8 (path route 9). Note that such a leftward and rightward illustration of the diagnosed unit 7 and the cell test equipment 8 is adopted also in the later figures.

As shown in FIG. 2, the cell diagnosis system according to the first aspect of the present invention is constituted by a plurality of cell test equipment 8, path setting means 11, and a return loop forming means 12.

The plurality of cell test equipment 8 send cells for the cell diagnosis of continuity to one specified unit (diagnosed unit 7) among the various units constituting the cell exchange 10.

The plurality of path setting means 11 are provided corresponding to the cell test equipment 8 in order to form, in the cell exchange 10, paths for leading cells sent from the cell test equipment 8 to the diagnosed unit 7.

The return loop forming means 12 is provided in the diagnosed unit 7 so as to return the group of cells, led to the paths and concentrated at the diagnosed unit 7, via the path in the cell exchange 10 to respective cell test equipment 8.

Figure 3:
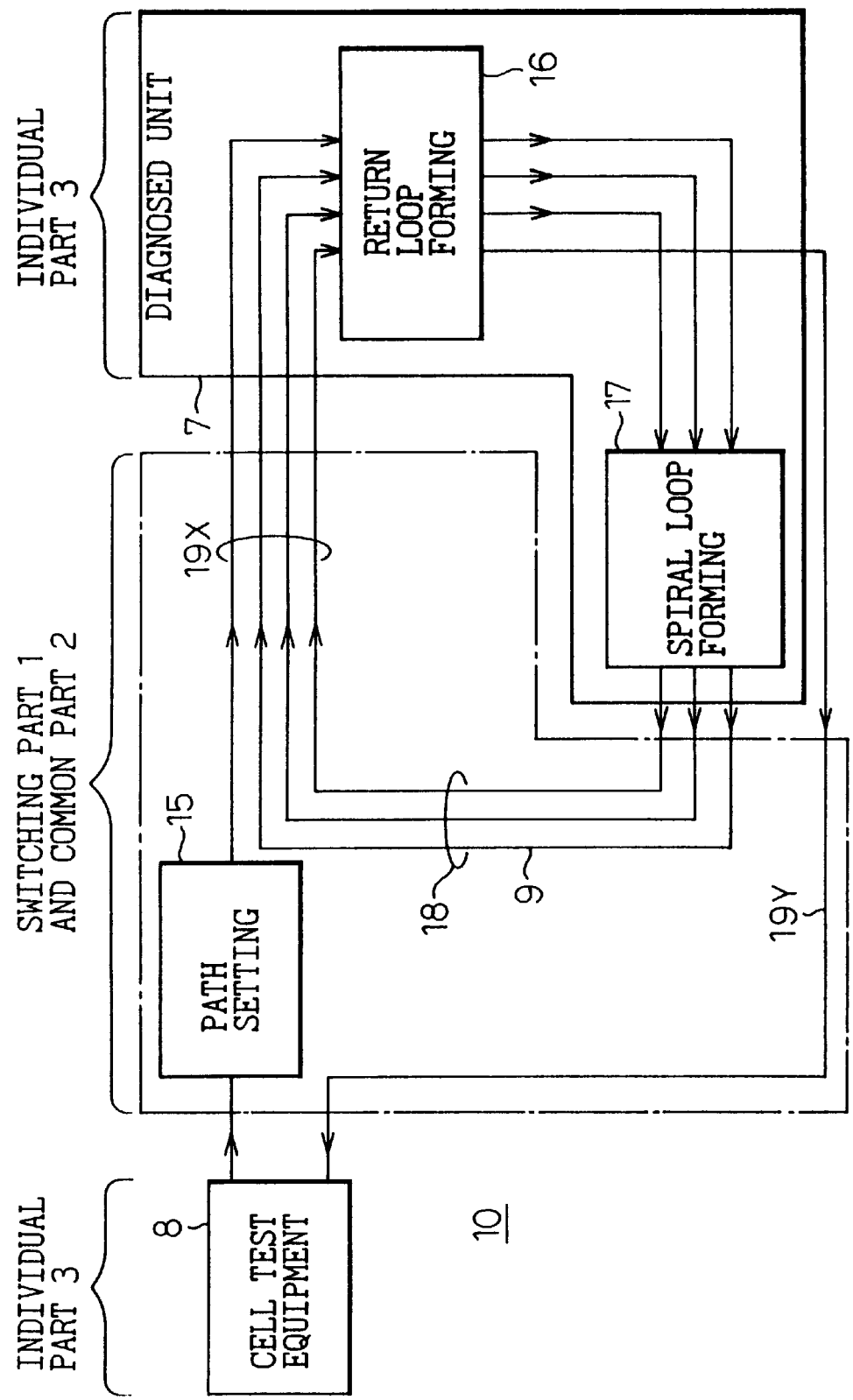
FIG. 3 is a view of a system for achieving cell diagnosis of continuity according to a second aspect of the present invention.

FIG. 3 is a view of the system for achieving cell diagnosis of continuity according to the second aspect of the present invention.

As shown in the figure, the cell diagnosis system according to the second aspect of the invention replaces the plurality of cell test equipment 8 in the system of FIG. 2 with a single cell test equipment 8. Further, due to this, the system for achieving cell diagnosis of continuity is constituted by a path setting means 15, a return loop forming means 16, and a spiral loop forming means 17.

The single cell test equipment 8 sends cells for the cell diagnosis of continuity to one specified unit (diagnosed unit 7) among the various units constituting the cell exchange 10.

The path setting means 15 is provided in order to form, in the cell exchange 10, paths for leading cells sent from the single cell test equipment 8 to the diagnosed unit 7.

The return loop forming means 16 is provided in the diagnosed unit 7 so as to return the cells from the paths at the diagnosed unit 7.

The spiral loop forming means 17 sets the path, in the cell exchange 10, for repeatedly returning the cells returned by the return loop forming means 16 to the diagnosed unit 7 so as to form a spiral loop.

According to the above example, if the individual part 3 to be diagnosed has a maximum operating band width capable of handling a 622 Mbps speed, the conventional cell test equipment 8 with a maximum cell feeding speed of 156 Mbps cannot sufficiently perform cell diagnosis of continuity with respect to the unit 7.

Therefore, in the system for achieving cell diagnosis of continuity according to the first aspect of the present invention (FIG. 2), four units of cell test equipment 8 each having limit of 156 Mbps speed (4×156 Mbps→622 Mbps) are provided in parallel and cells are sent from the four units of cell test equipment 8 so that these cells concentrate almost simultaneously at the diagnosed unit 7. Here, a test speed of substantially 622 Mbps is realized in the diagnosed unit 7.

In short, in the system for achieving cell diagnosis of continuity according to the first aspect of the present invention (FIG. 2), two or more units of cell test equipment 8 are provided and cells are simultaneously sent from all units of the cell test equipment 8 to the diagnosed unit 7 via the path to make cells concentrate at the diagnosed unit 7.

Then, a forward path and backward path which turn around at the diagnosed unit 7 are set by the two or more units of the cell test equipment 8 separately.

Here, when the maximum operating band width of the diagnosed unit 7 is one for "M" bps speed and the maximum cell feeding speed of each unit of the cell test equipment 8 is "N" bps (M>N), M/N number of units of cell test equipment 8 are used. More precisely, the number is the nearest whole number larger than M/N.

More preferably, the returning point in the diagnosed unit 7 when returning cells concentrated at the diagnosed unit 7 to the cell test equipment 8 is formed at the side nearer to the outgoing path of this diagnosed unit 7. Since this outgoing path exists nearest to the subscriber side, cells input to the diagnosed unit 7 for its diagnosis enter into the deepest position of the unit 7, therefore the diagnosis will be made up thoroughly.

On the other hand, consider the system for achieving cell diagnosis of continuity according to the second aspect of the invention shown in FIG. 3. According to the above example, when assuming that the individual part 3 now being diagnosed, that is, the diagnosed unit 7, has a maximum operating band width for handling a 622 Mbps speed, a conventional cell test equipment 8 with a maximum cell feeding speed of 156 Mbps cannot sufficiently perform cell diagnosis of continuity with respect to the unit 7.

However, the system for achieving cell diagnosis of continuity according to the second aspect of the present invention can handle a maximum operating band width of 622 Mbps by a single unit of the cell test equipment 8 without introducing two or more units of cell test equipment 8 like the same system of FIG. 2 (first aspect). Namely, it is characterized in that the diagnosis is carried out by a single unit of the cell test equipment 8.

For this reason, a plurality of path routes 9 are set so that cell trains are transferred along a spiral loop 18 in the cell exchange 10 while passing through the diagnosed unit 7 a plurality of times.

Here, a single cell train is transferred from the single unit of cell test equipment 8 for exactly a predetermined sending time so that the cell trains transferred on the forward path 19X to the diagnosed unit 7 along the spiral loop 18 concentrate simultaneously at the diagnosed unit 7 in a predetermined concentrating time.

When the maximum operating band width of the diagnosed unit 7 is one for "M" bps speed and the maximum cell feeding speed of the single unit of cell test equipment 8 is "N" bps (M>N), the number of the forward paths 19X is M/N, therefore, when adding the backward path 19Y, the total number of the paths is set to M/N+1.

By the above example, when assuming that the maximum operating band width "M" bps is 622 Mbps and the maximum cell feeding speed "N" bps is 156 Mbps, the number of the forward paths 19X (M/N) is the nearest whole number larger than M/N, that is 4. When adding one backward path 19Y to this, the total number of the paths becomes 5 (=4+1).

Note that in the system for achieving cell diagnosis of continuity according to the second aspect of the invention as well, in the same way as the system according to the first aspect of the invention, the return loop (16) for switching from the forward path of preceding stage to the forward path of the following stage is formed at the side nearer to the outgoing path of the diagnosed unit 7. This is for entering deep into the unit 7 to diagnose it thoroughly as mentioned before.

Below, embodiments of the present invention will be explained in detail. Before this, however, a simple explanation will be made of the system for achieving cell diagnosis of continuity of the related art in the ordinary cell exchange shown in FIG. 29 as background for comparison with the present invention.

FIG. 30 is a view of a concrete example of the ordinary system for achieving cell diagnosis of continuity of the related art. The figure shows both of the diagnosed unit 7 and cell test equipment 8 belonging to the individual part 3 at the left and right of the switching part 1 and the common part 2 in the same way as FIG. 1 and FIG. 2. Note that the concrete example of units shown in the figure, that is, TCSW #0, TCSW #1, (1) and (2) of AIFCOM #1, (1) and (2) of AIFCOM #0, and BTSU, are as already explained. Along with the illustration of the diagnosed unit 7 and cell test equipment 8 at the left and right, (1) and (2) of AIFCOM #0 and (1) and (2) of AIFCOM #1 forming the common part 2 are drawn at the left and right of the TCSW #0 and TCSW #1. Accordingly, the AIFCOMs on the left side and the corresponding AIFCOMs on the right side are the same units.

Further, in FIG. 30, as the diagnosed unit 7 belonging to the individual part 3, an explanation will be made by taking as an example an OC12C (optical carrier level 12 signal concatenated) unit among the specifications such as OC3C, OC12C, STM1, STM4, DS1, and DS3. An OC12C unit guarantees a maximum operating band width of 622 Mbps. Below, the diagnosed unit 7 will be also referred to as an OC12C unit.

In order to perform the diagnosis of the OC12C unit, first, the unit 7 must be placed out-of-service (OUS), that is, must be isolated. The OC12C unit is diagnosed according to the following procedures in this OUS state. Note that this OUS state is created by the operator shown at the lower end of FIG. 29 by inputting a diagnosis command.

Diagnosis Procedure

1. A forward path to the OC12C unit to be diagnosed is set from the BTSU 8 in an in-service (INS) state, that is, an operating state, to form a path route for cell diagnosis of continuity.

2. A backward path returning to the BTSU 8 is set from the OC12C unit to be diagnosed.

3. A return loop is set with respect to the OC12C unit to be diagnosed.

4. Testing cells are sent from the BTSU 8 at the maximum cell feeding speed of this unit 8, i.e., 156 Mbps. The testing cells are transferred on and along the above set path (forward path), returned at the OC12C unit on and along the backward path, and collected at the BTSU How the thus collected cells are diagnosed is determined by the requirements of the operator. For example, i) it is checked if a failure occurs in the OC12C unit (diagnosed unit 7) or ii) the cells collected at the BTSU 8 are checked and failure such as cell duplication or loss of cells is detected.

Next, the set paths and loop points for diagnosis of continuity are released.

Figure 4:
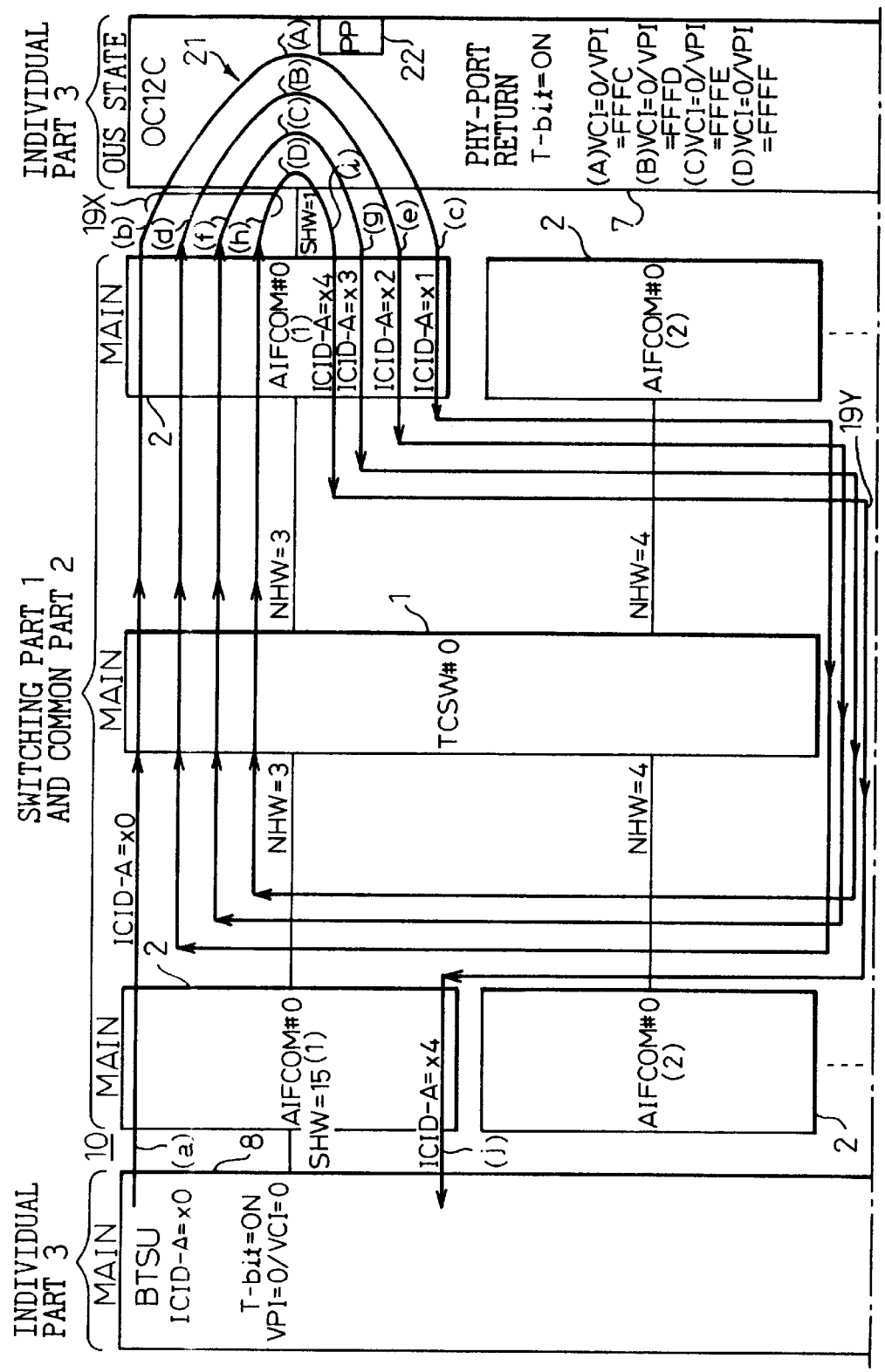
FIGS. 4 and 5 are first and second parts of a view of an embodiment of the system (second aspect) shown in FIG. 3.
Figure 5:
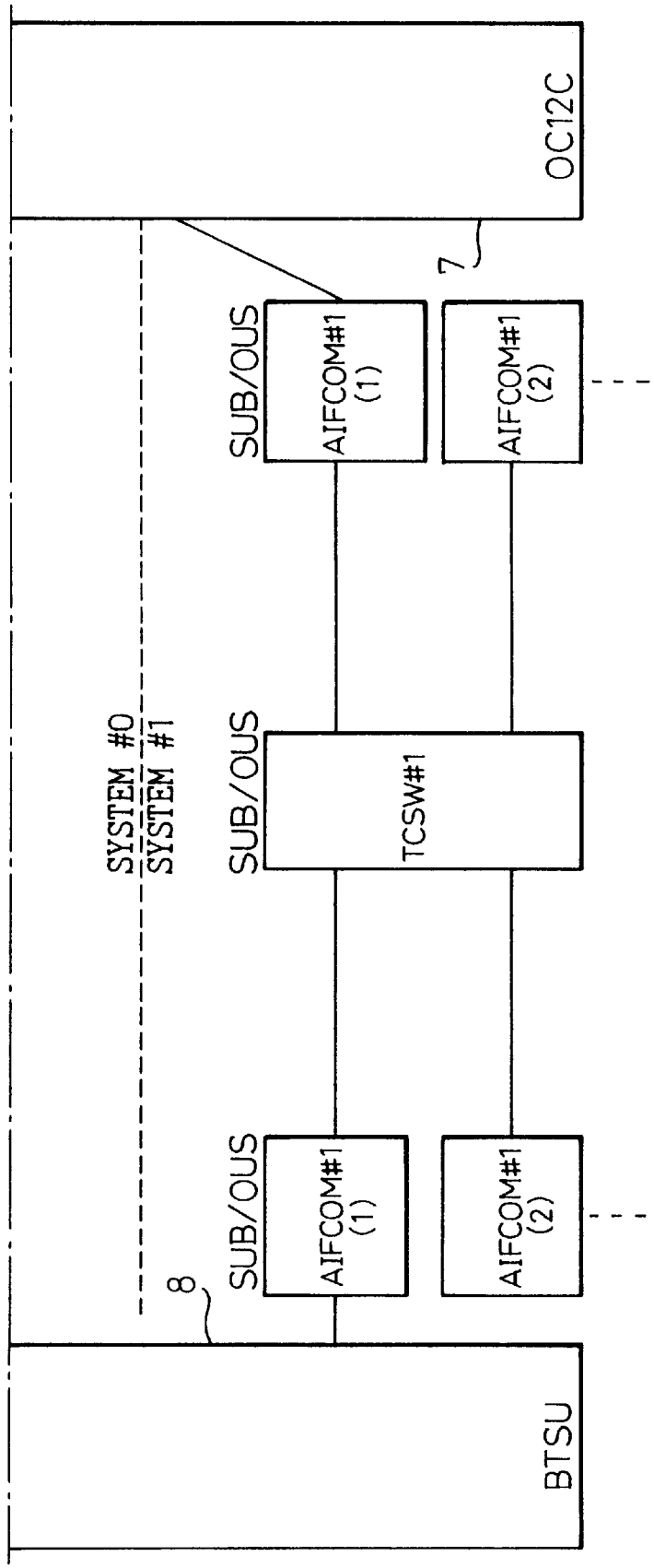

FIGS. 4 and 5 are first and second parts of a view of an embodiment corresponding to the system shown in FIG. 3 (second aspect). Note that an embodiment corresponding to the system shown in FIG. 2 (first aspect) will be explained later.

FIG. 4 mainly shows the system #0, that is, the working side (MAIN) system; while FIG. 5 mainly shows the system #1, that is, the protection side (SUB) system. Accordingly, the explanation will be made mainly by referring to FIG. 4. Further, FIG. 4 and FIG. 5 illustrate the case where the OC12C unit 7 and the BTSU 8 are mounted on the same shelf. A case where the OC12C unit 7 and BTSU 8 are mounted on different shelves will be illustrated later.

The cell exchange 10 is configured with the TCSW #0 (switching part 1) is located at the center, the AIFCOM #0 (1) (common part 2) connected to for example the third network side highway (NHW=3), the BTSU unit (cell test equipment 8) connected to the common part 2 via for example the 15th subscriber side highway (SHW=15), and the OC12C unit (diagnosed unit 7) connected to the common part 2 via for example the first subscriber side highway (SHW=1). Note that, in the actual case, the AIFCOM #0 comprises the AIFCOM #0 (1) to AIFCOM #0 (8), so the NHWs comprise the NHW=0 to NHW=8. Since the SHWs comprise the SHW=0 to SHW=15, the individual part 3 comprises 16 units (including the cell test equipment (BTSU) 8 and diagnosed unit 7).

Diagnosis Procedure

1. A path is set from the outgoing port (a) of the BTSU (cell test equipment 8) through TCSW #0 (switching part 1) to an outgoing port (b) of the AIFCOM #0 (1) (common part 2).

2. A path is set from an incoming port (c) of the AIFCOM #0 (1) through the TCSW#0 to an outgoing port (d) of the AIFCOM #0 (1).

3. A path is set from an incoming port (e) of the AIFCOM #0 (1)through the TCSW#0 to an outgoing port (f) of the AIFCOM #0 (1).

4. A path is set from an incoming port (g) of the AIFCOM #0 (1) through the TCSW#0 to an outgoing port (h) of the AIFCOM #0 (1).

5. A path returning to an incoming port (j) of the BTSU is set from an incoming port (i) of the AIFCOM#0 (1).

6. A return loop is set in the OC12C unit (diagnosed unit 7). The return loop 21 in this case is formed so as to pass through the loop points (A), (B), (C), and (D) for the route (b)→(c), the route (d)→(e), the route (f)→(g), and the route (h)→(i), respectively.

7. A single testing cell train (maximum cell feeding speed of 156 Mbps) is sent from the outgoing port (a) of the BTSU. The sent single cell train is circulated along the path route of (a)→(b)→(c)→(d)→(e)→(f)→(g)→(h)→(i) four times in the OC12C unit.

Next, it returns through the backward path 19Y to the incoming port (j) of the BTSU where it is collected.

As already explained, how the thus collected cells are diagnosed is determined according to the requirements of the operator. For example, i) it is checked if a failure occurred in the OC12C unit (diagnosed unit 7) or ii) cells collected at the BTSU 8 are checked and failures such as cell duplication or loss of cells are detected.

Next, the set paths and loop points for diagnosis of continuity are released.

Figure 6:
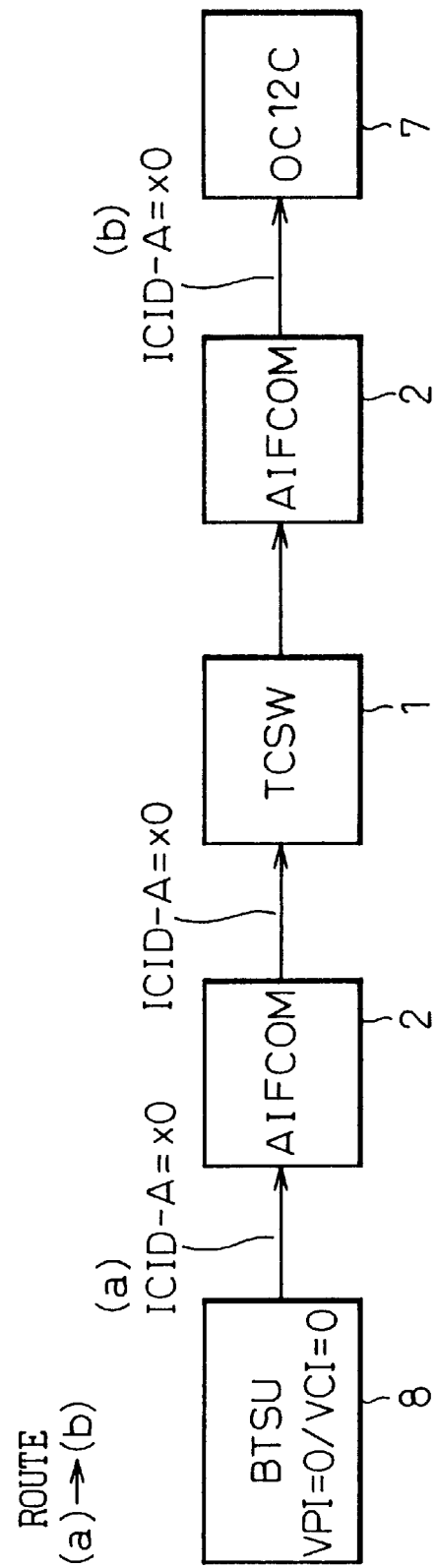
FIG. 6 is a view illustrating the path route (a)→(b) in FIG. 4 in a readily understandable form.
Figure 7:
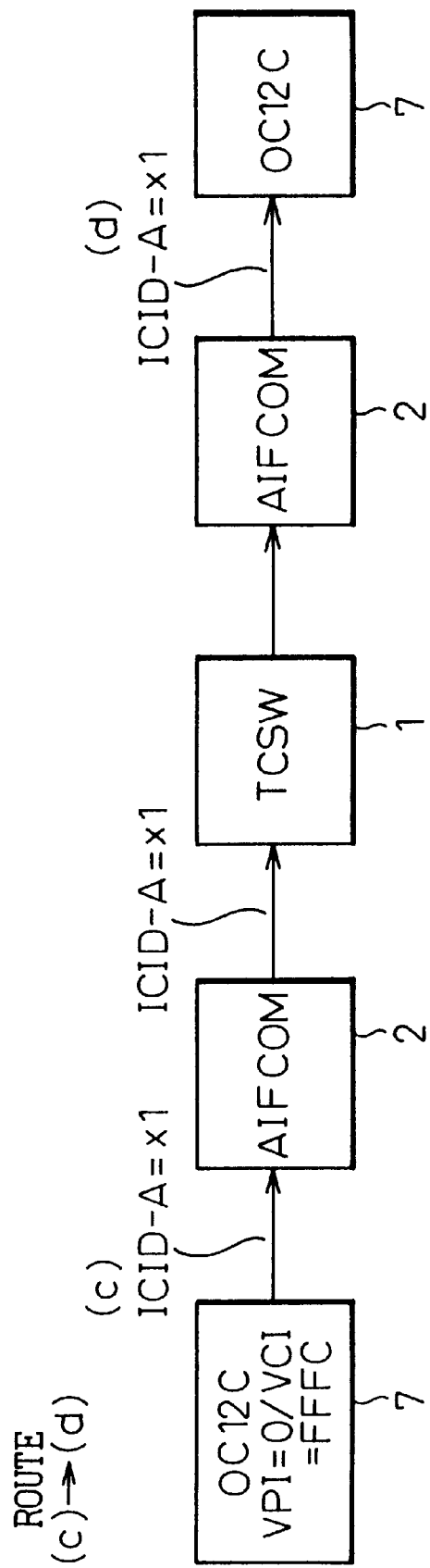
FIG. 7 is a view illustrating the path route (c)→(d) in FIG. 4 in a readily understandable form.
Figure 8:
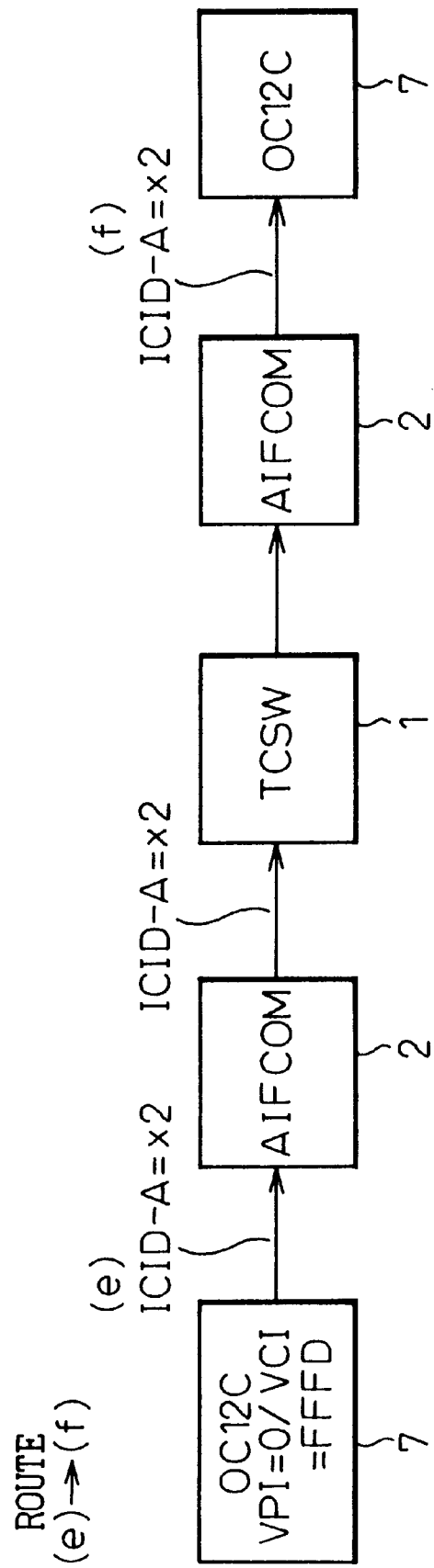
FIG. 8 is a view illustrating the path route (e)→(f) in FIG. 4 in a readily understandable form.
Figure 9:
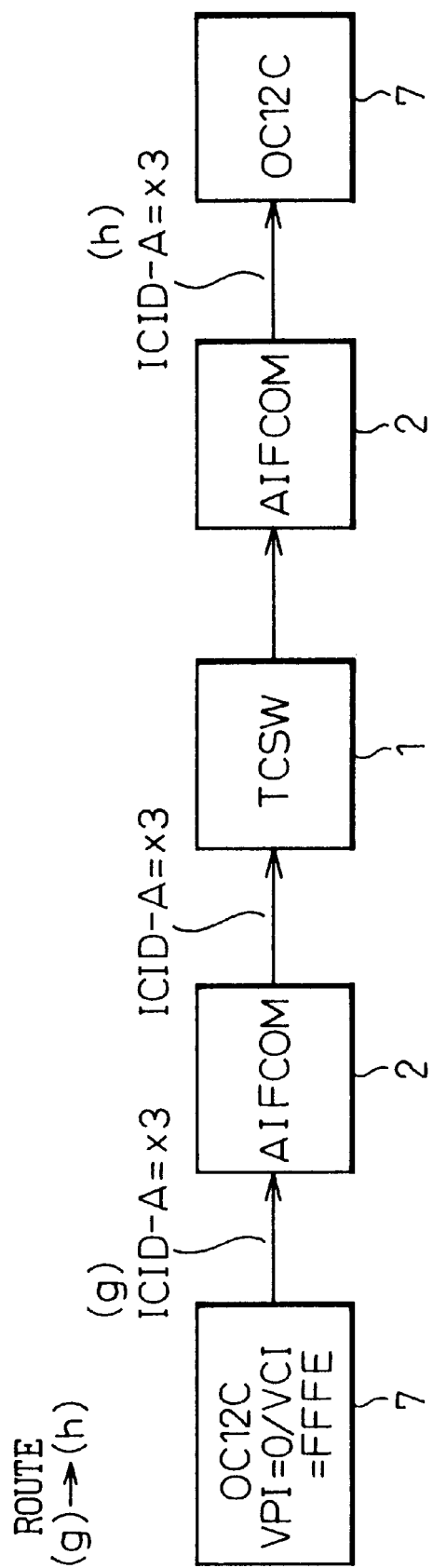
FIG. 9 is a view illustrating the path route (g)→(h) in FIG. 4 in a readily understandable form.
Figure 10:
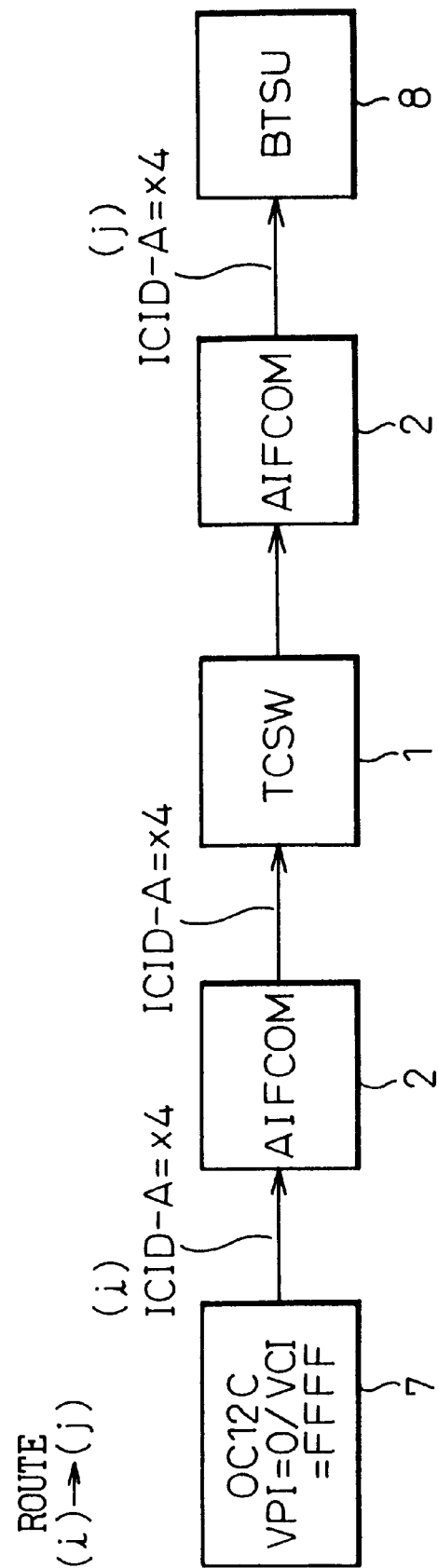
FIG. 10 is a view illustrating the path route (i)→(j) in FIG. 4 in a readily understandable form.

FIG. 6 is a view illustrating the path route (a)→(b) in FIG. 4 in a readily understandable form;

FIG. 7 is a view illustrating the path route (c)→(d) in FIG. 4 in a readily understandable form;

FIG. 8 is a view illustrating the path route (e)→(f) in FIG. 4 in a readily understandable form;

FIG. 9 is a view illustrating the path route (g)→(h) in FIG. 4 in a readily understandable form; and FIG. 10 is a view illustrating the path route (i)→(j) in FIG. 4 in a readily understandable form.

FIG. 6 to FIG. 10 correspond to the step of 6 in the above diagnosis procedures.

In FIG. 6, the VPI/VCI values indicated by the header of testing cells to be sent from the outgoing port (a) of the BTSU are VPI=0/VCI=0 (refer to VPI=0/VCI=0 shown at the left end of FIG. 4). Note that "T-bit=ON" shown attached to this VPI=0/VCI=0 means that a flag indicating test use is set at the T-bit in the header, of a cell which is a testing use cell. A cell in which this T-bit flag is set is differentiated from ordinary user cells.

In the BTSU (cell test equipment 8) of FIG. 6, path conversion corresponding to VPI/VCI=0 is carried out. For this path conversion, the path connection information used between the common part 2 and the individual part 3 is used. This is already existing information. In a general cell exchange to which the present invention is applied, this is referred to as "ICID-A information". This VPI/VCI=0 is path-converted to the path connection ICID-A=x0. This ICID-A information is written as tag information in the header. The path conversion is carried out by using a so-called virtual channel connection (VCC) table.

In FIG. 6, cells with headers including the tag information ICID-A=x0 pass through the AIFCOM (common part 2) and the TCSW (switching part 1) and are input from the outgoing port (b) of the AIFCOM to the OC12C unit (diagnosed unit 7). Here, the input cells are returned at the loop point (A) in the OC12C unit.

Referring to FIG. 7, cells returned at the OC12C unit (diagnosed unit 7) are given the predetermined VPI=0/VCI=FFFC at their headers. Then, further, they are path-converted to the path connection information ICID-A=x1 corresponding to this VPI=0/VCI=FFFC. This path conversion is also carried out by using a so-called VCC table. In short, by rewriting, in the diagnosed unit, the tag information added to the header portion of each cell, the route is repeatedly changed over from the forward path of the preceding stage to the forward path of the following stage.

After this, the cells return to the BTSU (cell test equipment 8) after passing through FIG. 8, FIG. 9, and FIG. 10. At this time, the headers of the cells passing through the loop points (B), (C), and (D) are given predetermined VCI=0/VPI=FFFD, VCI=0/VPI=FFFE and VCI=0/VPI=FFFF and path-converted to ICID-A=x2, ICID-A=x3, and ICID-A=x4, respectively.

The return of cells in the OC12C unit (diagnosed unit 7) is preferably carried out at the side nearer the outgoing path in the OC12C unit in all of the loop points (A) to (D). This is for diagnosis up to the depth of the OC12C unit as mentioned above. More specifically, it is preferably carried out at a physical port (PHY-PORT) 22 shown on the right end of FIG. 4. The forward part from the physical port 22 is connected to subscriber lines.

Note that, even if the loop points (A) to (D) are concentrated at this physical port 22, no failure occurs in the transfer of the cell trains. This is because different VPI/VCI values are assigned for every loop point and different ICID-A information are set, so the logical channels differ for every route.

Figure 11:
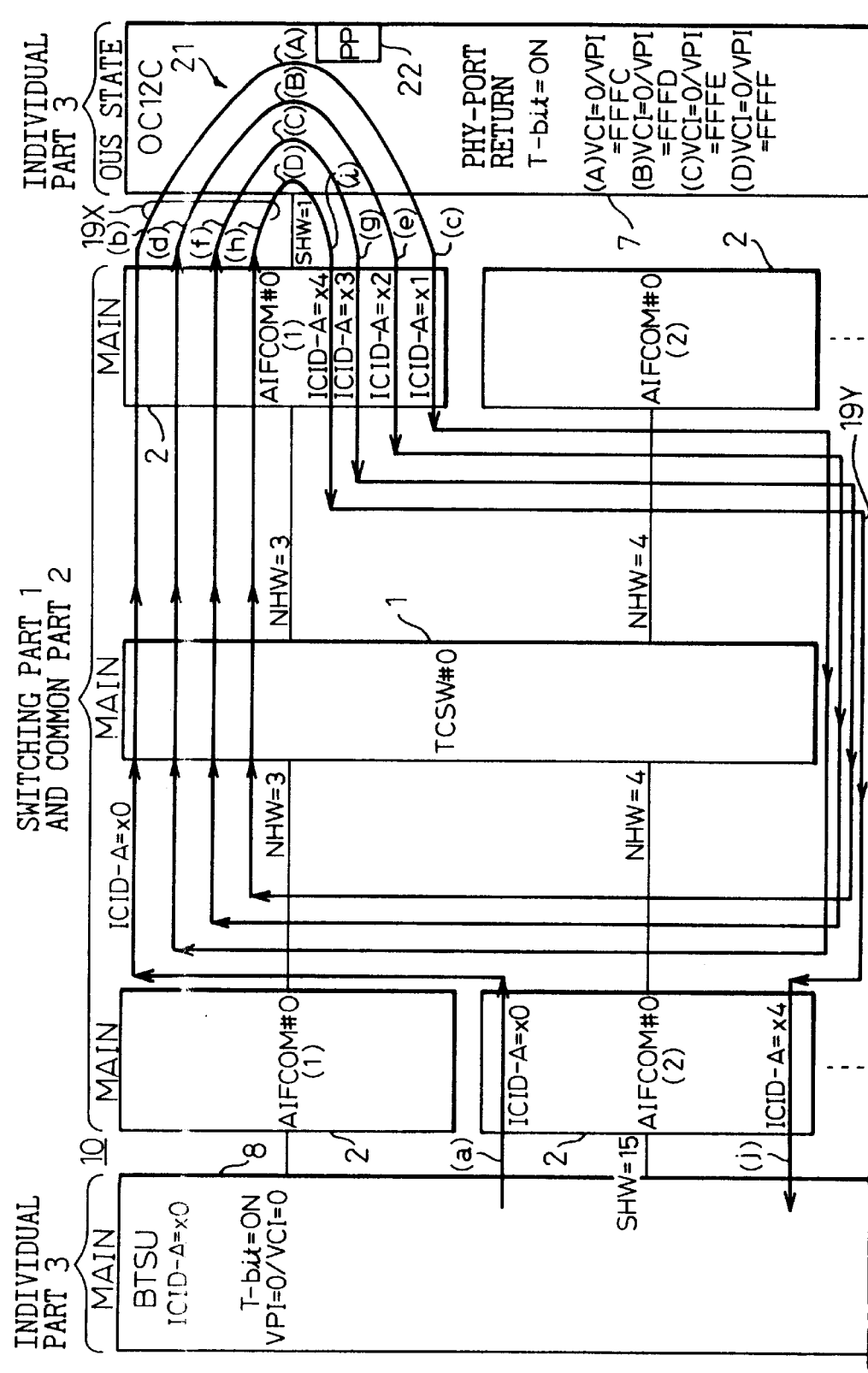
FIGS. 11 and 12 are first and second parts of a view of an embodiment of the system (second aspect) shown in FIG. 3.
Figure 12:
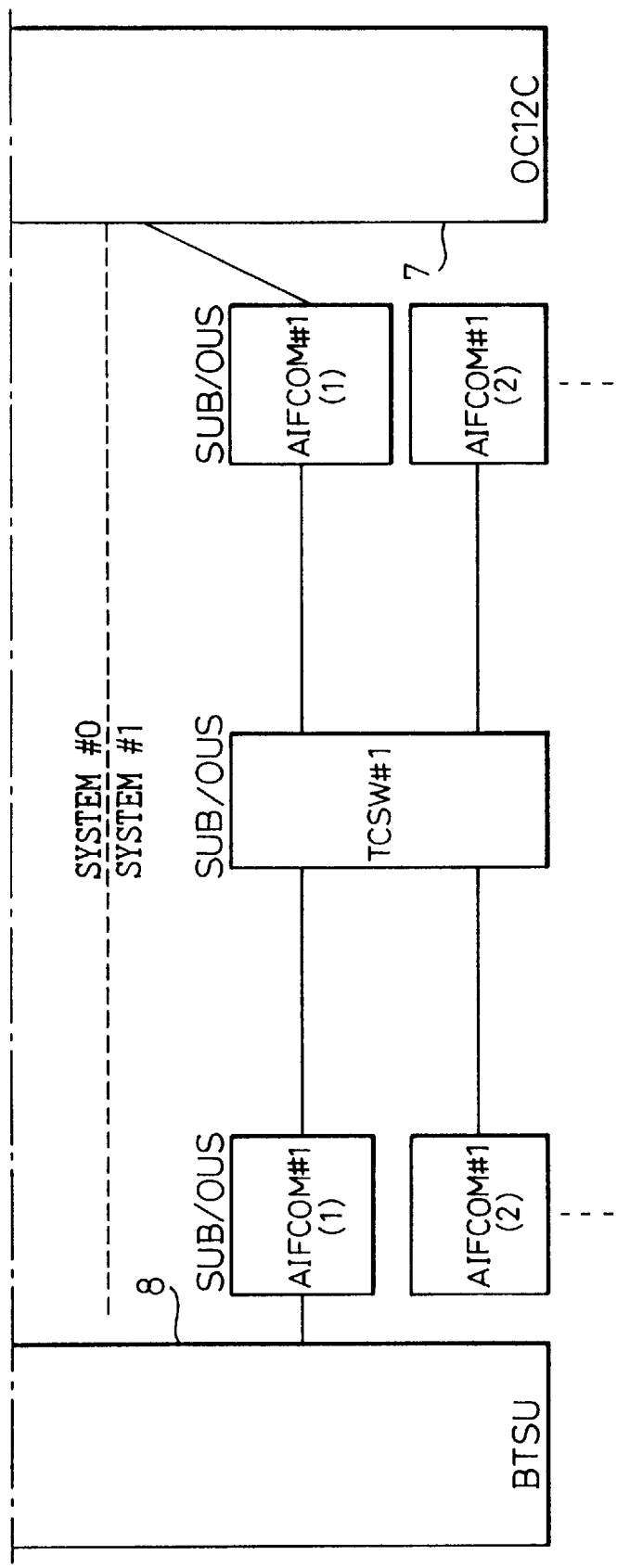

FIGS. 11 and 12 are first and second parts of a view of an embodiment corresponding to the system shown in FIG. 3 (second aspect). In contrast to FIG. 4 and FIG. 5 showing a path route of a case where the OC12C unit (7) and BTSU (8) are mounted on the same shelf, FIG. 11 and FIG. 12 show a path route of a case where the OC12C unit (7) and BTSU (8) are mounted on different shelves. Note that the principle of operation is no different from the case of FIG. 4 and FIG. 5, so the explanation of the operation of FIG. 11 and FIG. 12 will be omitted.

Figure 13:
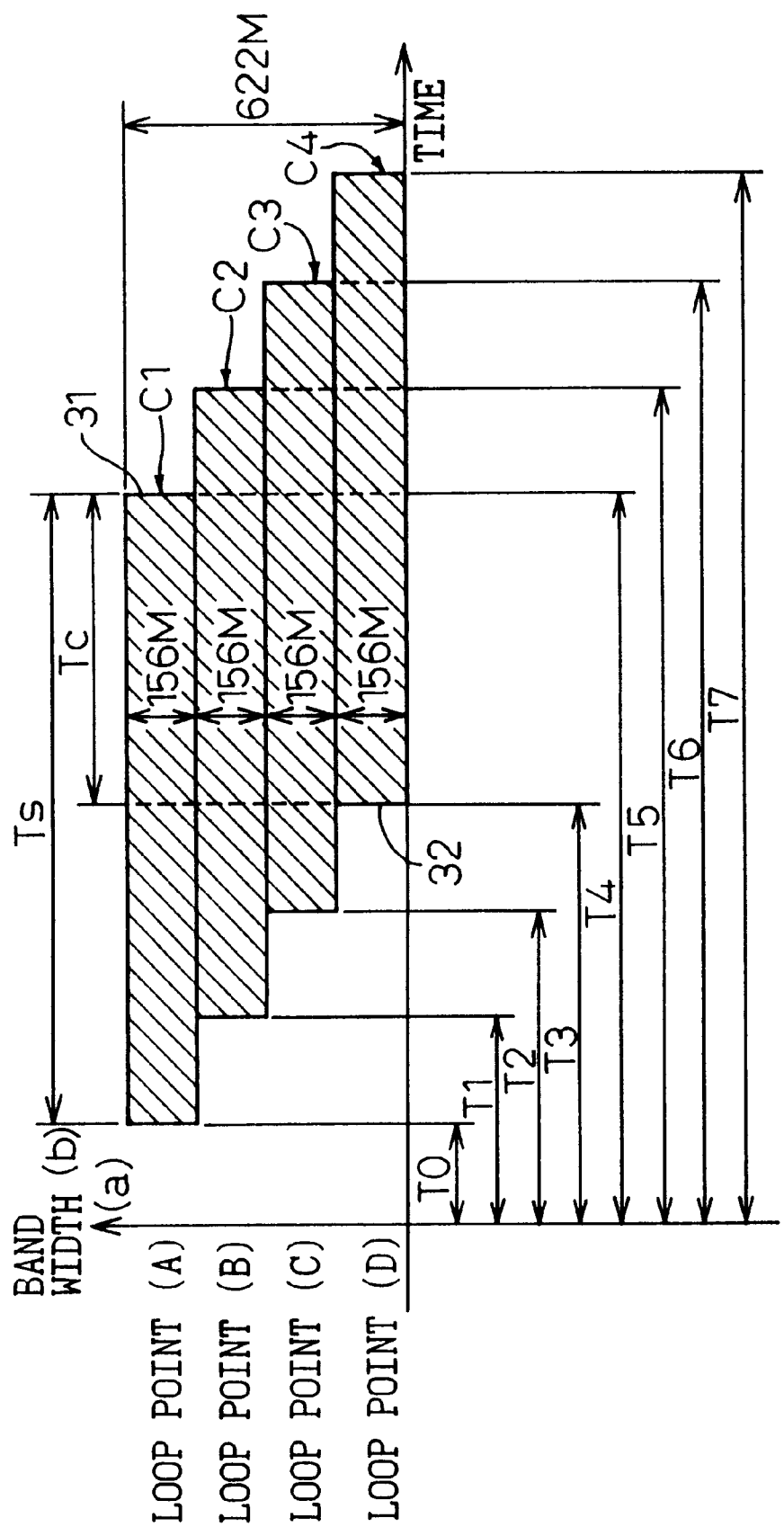
FIG. 13 is a view illustrating the cell trains when passing through the loop points (A) to (D) of FIG. 4.

FIG. 13 is a view illustrating cell trains when passing through the loop points (A) to (D) of FIG. 4. From this figure, it will be easily understood that a state equivalent to the maximum operating band width 622 Mbps is temporarily created in the diagnosed unit (OC12C unit) 7.

Explaining this by also referring to FIG. 4 (same also for FIG. 11), C1, C2, C3, and C4 of FIG. 13 represents cell trains respectively passing through the loop points (A), (B), (C), and (D) along the spiral loop.

First, the cell trains sent from the outgoing port (a) of the BTSU (cell test equipment 8) reach the outgoing port (b) after a time T0. Then, they pass through the loop point (A) in the OC12C unit (diagnosed unit 7) just in a predetermined sending time Ts.

A cell train runs through the spiral loop, returns to the OC12C unit again after the time T1, and passes through the loop point (B) as the cell train C2. Similarly, it passes through the loop points (C) and (D) after the time T2 and T3 as the cell trains C3 and C4, respectively.

The above cell trains C2 to C4 are exactly the same as the cell train C1. The speed of each cell train is the maximum cell feeding speed of the BTSU (cell test equipment 8), i.e., 156 Mbps. When a cell train C1 is simultaneously concentrated as the cell trains C1 to C4, during the concentrating time Tc, the maximum operating band width of the OC12C unit, i.e., 622 Mbps is realized.

The above predetermined sending time Ts is determined so that the trail 31 (time T4) of the top cell train C1 first passing through the diagnosed unit (OC12C unit) 7 among the cell trains transferred on the forward paths appears later on the time axis than the head 32 of the final cell train C4 passing through the diagnosed unit 7 last among the cell trains transferred on the forward paths.

Further, when the predetermined concentrating time is set to Tc, the predetermined sending time Ts is determined so that a time difference between a time when the head 32 of the final cell train C4 appears and a time when the trail 31 of the top cell train C1 appears becomes the predetermined concentrating time Tc. FIG. 13 shows this state.

When the testing time by the single cell test equipment (BTSU) 8 is set, the predetermined concentrating time Tc is set according to the testing time.

In other words, the time duration Tc for obtaining the maximum operating band width is defined as Tc=T4−T3. At this time, T4 must be smaller than T5, T6, and T7. The conditions for sending the cells are, first, sending time is T3 or more and, second, T3<T4, T5, and T6.

Figure 14:
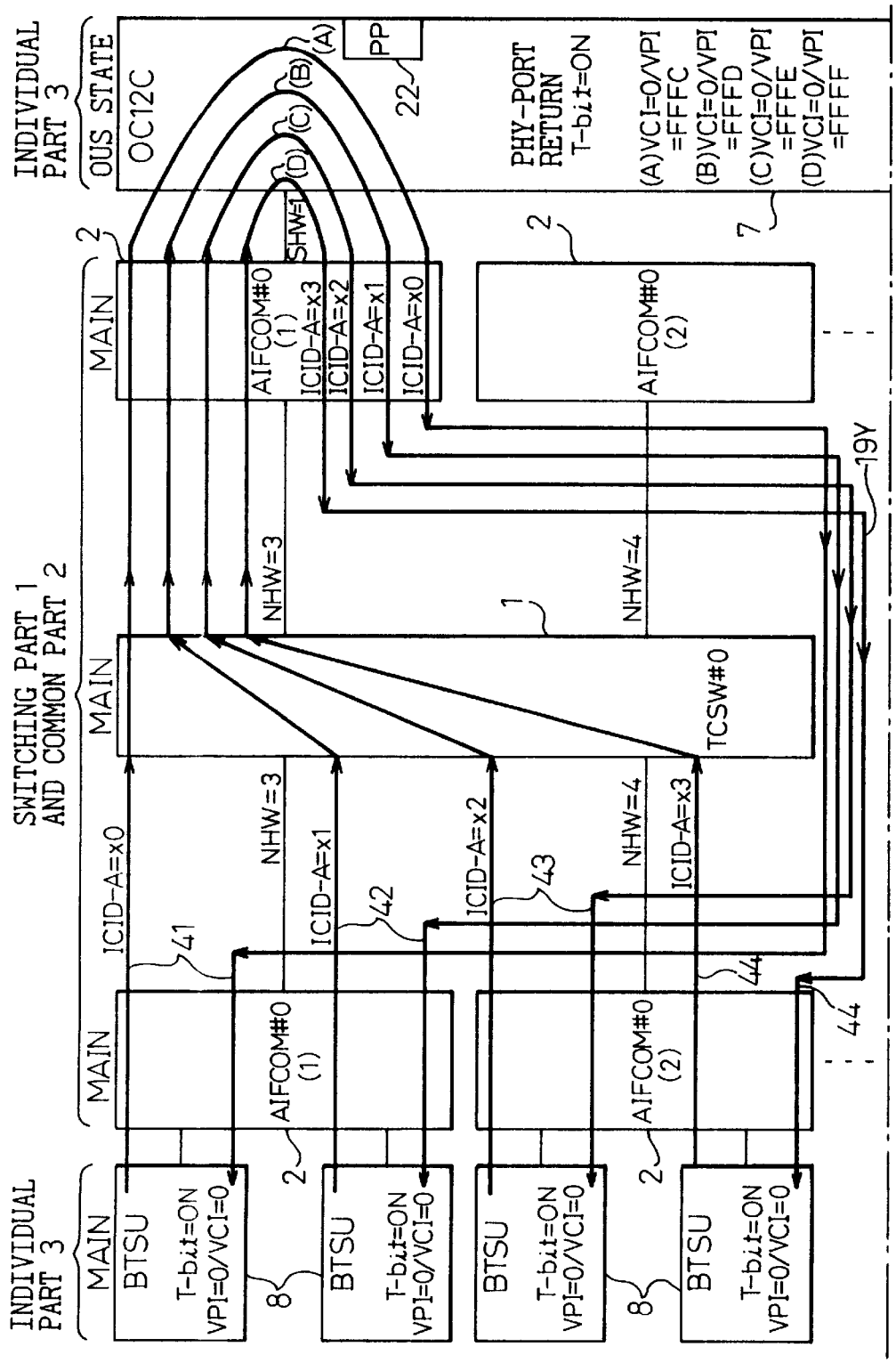
FIGS. 14 and 15 are first and second parts of a view of an embodiment of the system (first aspect) shown in FIG. 2.
Figure 15:
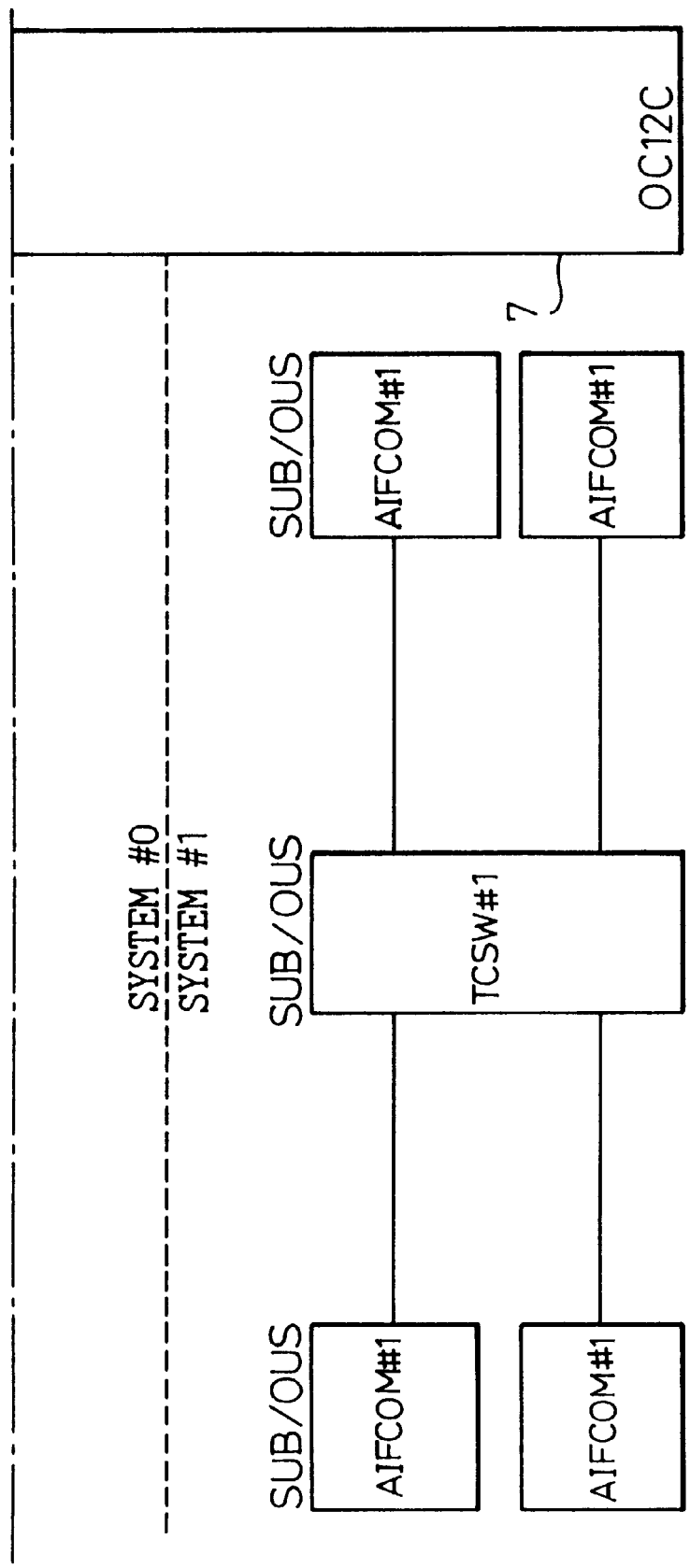

FIGS. 14 and 15 are first and second parts of a view of an embodiment corresponding to the system shown in FIG. 2 (first aspect).

This is basically the same as FIG. 4 and FIG. 5 except for the following points.

i) There is not one unit of cell test equipment (BTSU) 8, but four units.

ii) The spiral loop 18 is not formed, but four single loops 41, 42, 43, and 44 are formed.

Figure 16:
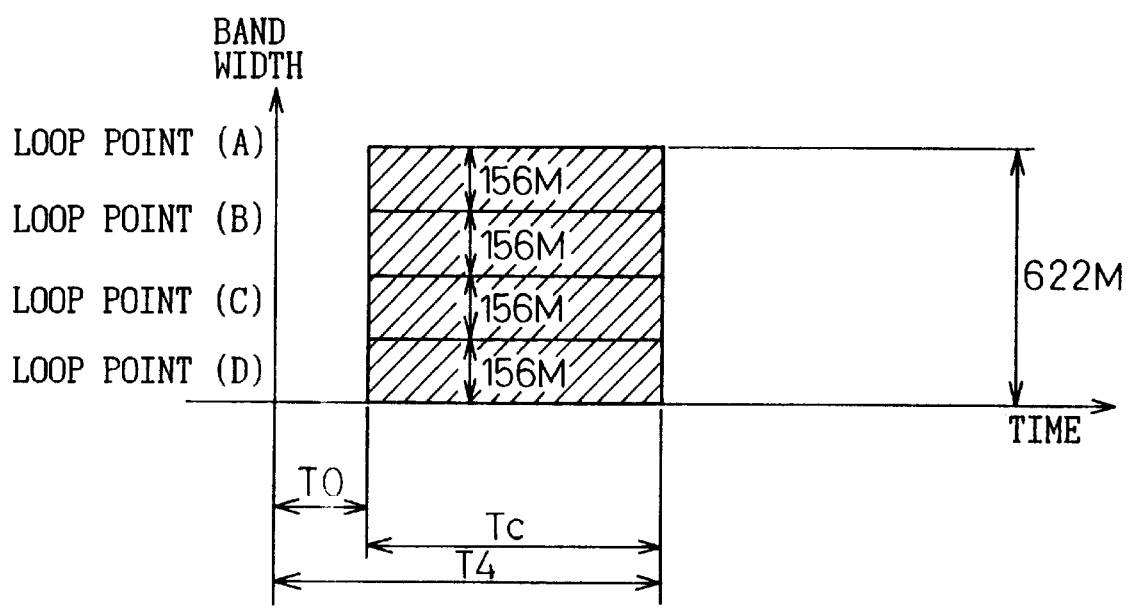
FIG. 16 is a view illustrating the cell trains when passing through the loop points (A) to (D) of FIG. 14.

FIG. 16 is a view illustrating the cell trains when passing through the loop points (A) to (D) of FIG. 14. The method of viewing the figure is the same as FIG. 13. When comparing FIG. 13 and FIG. 16, the case of FIG. 16 (first aspect) has the advantage that cells need not be uselessly passed during times other than the concentrating time Tc (testing time). However, the case of FIG. 16 is more disadvantageous than the case of FIG. 13 (second aspect) in the point that a plurality of units of cell test equipment (BTSU) 8 are required.

The above mentioned cell diagnosis of continuity is realized by executing a program stored in the recording medium 6 by the CP 5 of the computer 4 shown in FIG. 29. Namely, a medium 6 recording a program enabling a computer to execute cell diagnosis of continuity for one specified unit among the various units constituting the cell exchange 10 via the cell test equipment 8 is provided. The program is for (i) setting a plurality of paths between the diagnosed unit 7 and the cell test equipment 8 in the cell exchange 10;

(ii) concentrating the cells sent from at least one unit of cell test equipment 8 through a plurality of paths almost simultaneously at the diagnosed unit 7; and (iii) returning cells concentrated at the diagnosed unit 7 to the cell test equipment 8 via one of a plurality of paths.

Finally, a concrete detailed example will be given of each of the main elements in the configuration of the present invention.

Figure 17:
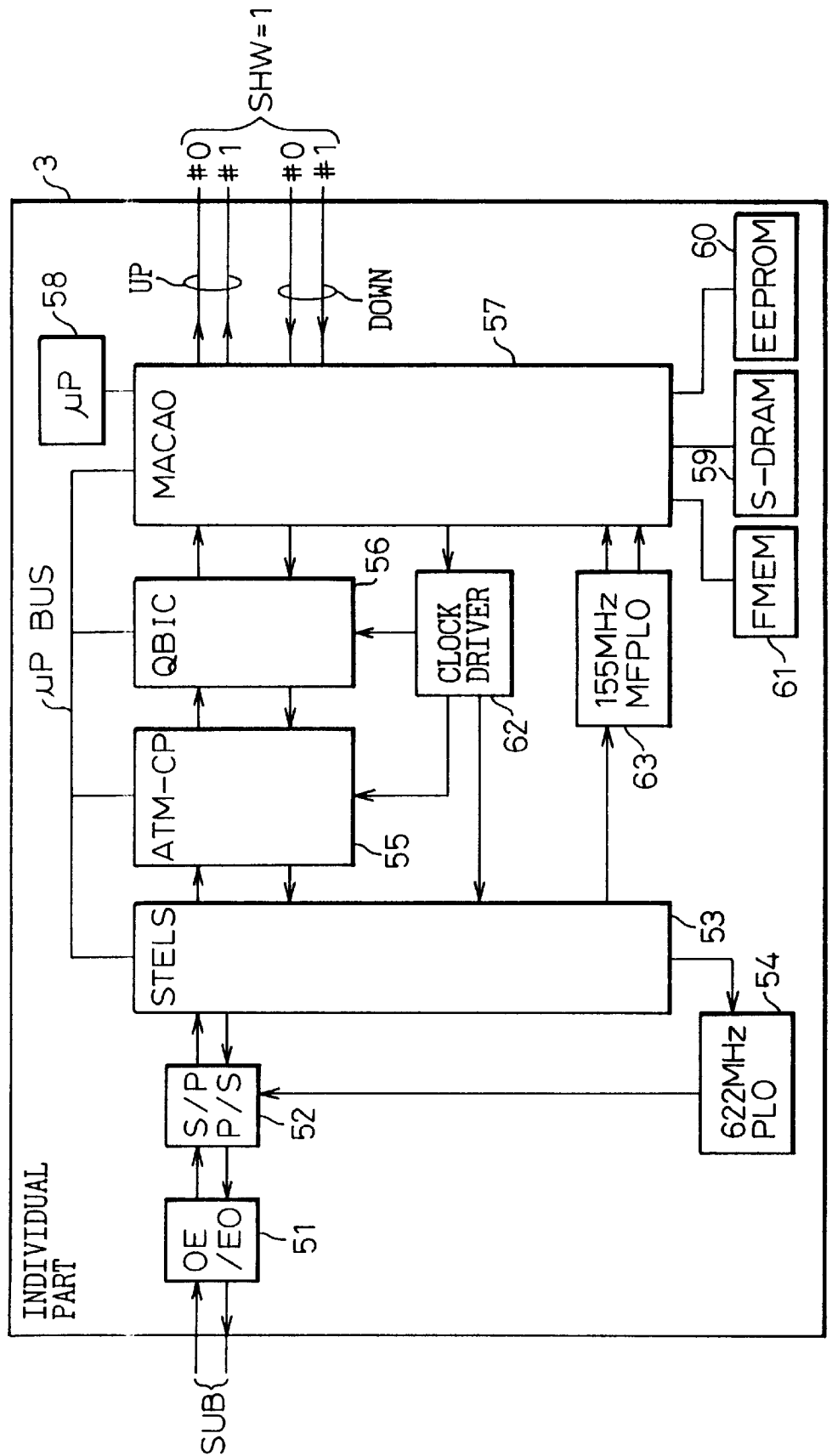
FIG. 17 is a block diagram of detailed example of an individual part 3.

FIG. 17 is a block diagram of a concrete detailed example of the individual part 3. In the figure, the subscriber side highway SHW=1 on the right end corresponds to the SHW=1 shown in FIG. 4 and FIG. 14. Each highway comprises an upstream (UP) line and a downstream (DOWN) line and is duplexed to the 0 side (#0) and 1 side (#1).

On the other hand, the left end in the figure is connected to the corresponding subscriber (not illustrated) SUB. An optical interface unit (OE/EO) 51 is provided at the connection part with this subscriber SUB. This optical interface unit 51 includes an electrical/optical and optical/electrical converter and performs a conversion between an optical signal of 622.08 Mbps and an electrical signal. Further, it performs extraction of clocks and extraction of frames from these signals.

The optical interface unit 51 is further connected to a serial/parallel mutual conversion unit 52.

The serial/parallel mutual conversion unit 52 is further connected to a SONET/SDH termination and ATM cell transforming unit 53. In the figure, this is indicated as STELS. This is an abbreviation for a SONET/SDH termination multiline interface chip for the F-150 BB ESP system. Note that this serial/parallel mutual conversion unit 52 corresponds to the physical port (PP) 22 of FIG. 4 and FIG. 14.

This SONET/SDH termination and ATM cell transforming unit 53 performs the following five functions:

i) Function of terminating the physical layer.

ii) Function of transferring alarms;

iii) Function of collecting performance monitor (PM). data of the physical layer;

iv) Function of terminating the ATM layer; and v) Function of loop back of the cells.

Note that, "622 MHz PL0 54" is a phase locked loop oscillator.

The above STELS 53 is further connected to the ATM cell processor (ATM-CP) 55. This performs the following five functions:

i) Function of degenerating the header;

ii) UPC (usage parameter control) function;

iii) Accounting function;

iv) NDC (network data collection) function; and v) Function of processing OAM (operation, administration, and maintenance) cells.

The ATM cell processor unit 55 is connected to the cell control unit (QBIC) 56. In the figure, this is indicated as "QBIC". This is an abbreviation of a "QCP and B-ISDN platform interface controller".

This cell control unit 56 performs the following four functions.

i) Function of controlling QCP (quality control path);

ii) Function of controlling ABR (available bit rate);

iii) Function of performing a shaping; and iv) Function of performing NDC.

The above cell control unit 56 is connected to the common part interface (MACAO) 57. This is indicated as "MACAO" in the figure. This is an abbreviation of a "microprocessor adapter and control highway handler for ATM application object". This common part interface 57 performs the following nine functions:

i) Function of interfacing cells with the common part 2;

ii) Function of sending reception/SCN (scan data) of SD (send data);

iii) Active side control function;

iv) Function of counting cells;

v) Function of generating cells;

vi) Function of looping cells;

vii) Function of controlling the periphery of the microprocessor ($\mu$P) 58;

viii) Function of controlling S-DRAM 59; and iv) Function of interfacing connector at front panel.

Note that reference numeral 60 indicates an EEPROM, 61 a flash memory (FMEM), 62 a clock driver, and 63 a 155 MHz multi-frame (MF) phase locked oscillator.

Figure 18:
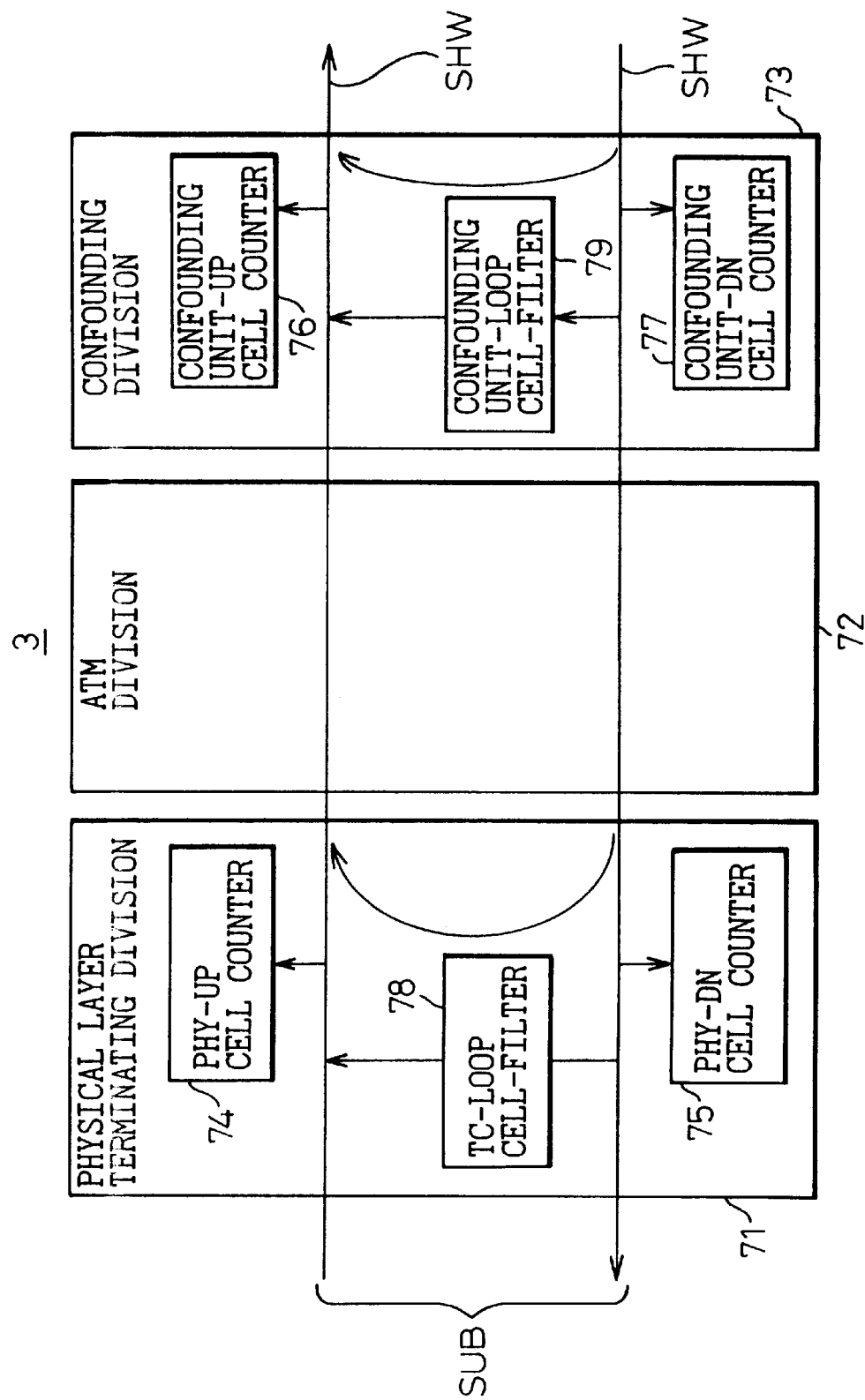
FIG. 18 is a block diagram of an example of an individual part 3 shown by three functional blocks.

FIG. 18 is a view of an example of the individual part 3 comprised by three functional blocks. In the figure, reference numeral 71 denotes a physical layer terminating division, 72 an ATM division, and 73 a confounding division.

When compared with the configuration of FIG. 17, the physical layer terminating division 71 corresponds to the STELS 53 of FIG. 17, the ATM division 72 corresponds to the ATM-CP 55 and QBIC 56 of FIG. 17, and the confounding division 73 corresponds to the MACAO 57 of FIG. 17.

In FIG. 18, the cell counters 74, 75, 76, and 77 are counters for counting the number of passing cells, a physical layer cell counter 74 and a confounding unit cell counter 76 exist upstream side (UP); and a physical layer cell counter 75 and a confounding unit cell counter 77 exist downstream side (DN).

The return of cells in the individual part 3 according to the present invention can be carried out by a loop cell filter. The filter formed in the physical layer terminating division 71 is a TC (transmission control)-loop cell filter 78, while the filter formed in the confounding division 73 is a confounding division-cell filter 79.

Only cells designated to be selectively looped back at the physical layer terminating division 71 are extracted by this filter 78 and returned from the lower side line to the upper side line in the figure.

Similarly, only cells designated to be selectively looped back at the confounding division 73 are extracted by this filter 79 and returned from the lower side line to the upper side line in the figure.

Figure 19:
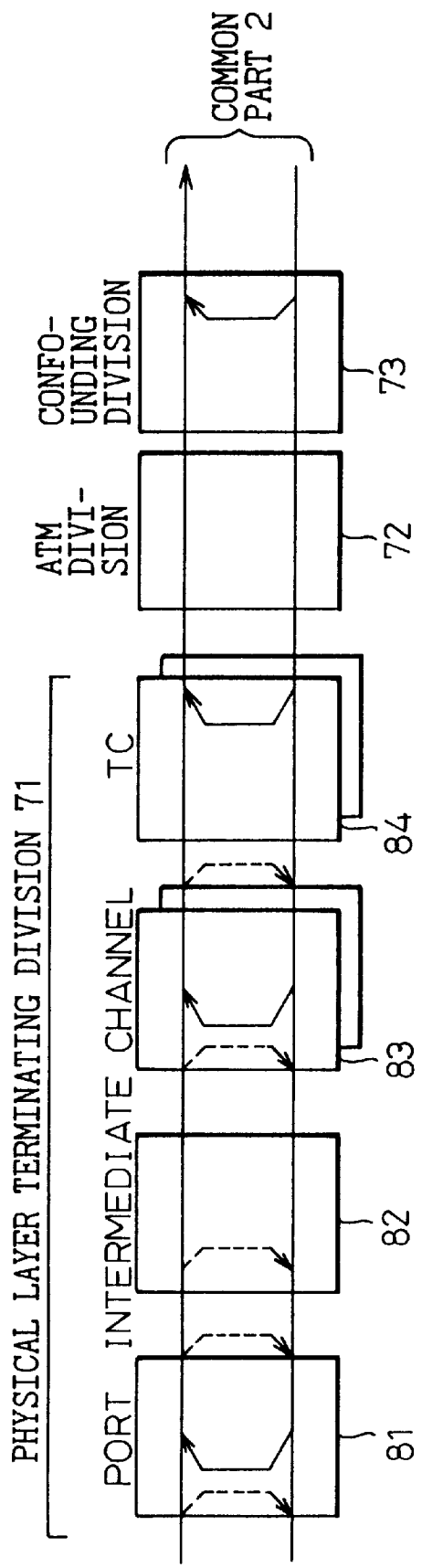
FIG. 19 is a view illustrating a state of the return of cells shown in FIG. 18 in a more readily understandable form.

FIG. 19 is a view illustrating a state of the return of cells shown in FIG. 18 in a more readily understandable form. In the figure, the arrangement of the physical layer terminating division 71, the ATM division 72, and the confounding division 73 is exactly the same as that of FIG. 18. Note that the physical layer terminating division 71 is shown further broken down into four blocks 81, 82, 83, and 84. Note that the block (intermediate) 82 and block (channel) 83 in the figure exist only in the channelized state, that is, only when a plurality of channels are allotted to one physical port. Accordingly, the ATM function can be realized in each channel.

Testing cells according to the present invention are transferred along various loops shown in FIG. 19. Information on through which loop cells are returned is written in the header etc. of the testing cells. The formats of the testing cells are shown in FIG. 20, FIG. 21, and FIG. 22.

Figure 20:
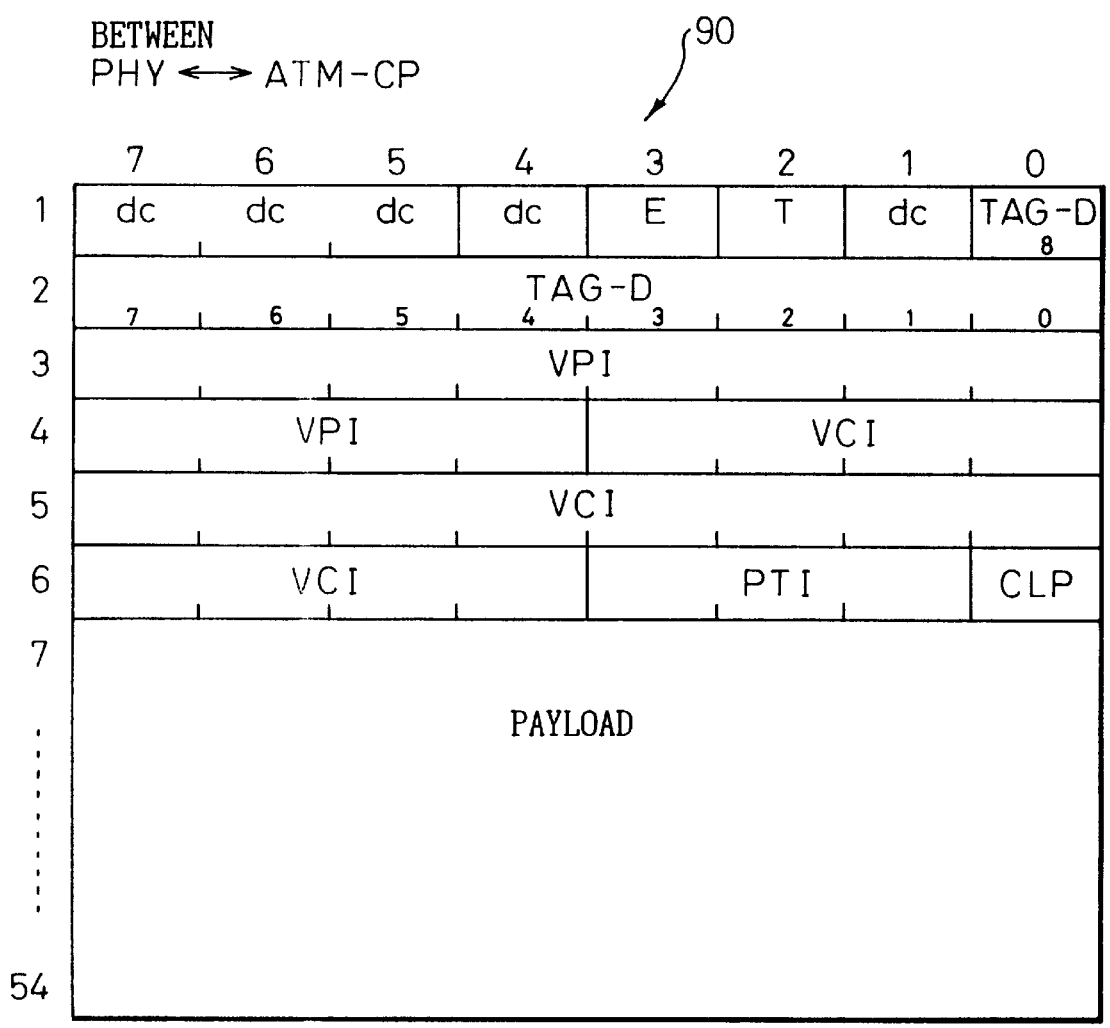
FIG. 20 is a view of an example of the format of testing cells transferred between a STELS53 and an ATM-CP55 in FIG. 17.

FIG. 20 is a view of an example of the format of the testing cells transferred between the STELS 53 and ATM-CP 55 in FIG. 17.

Figure 21:
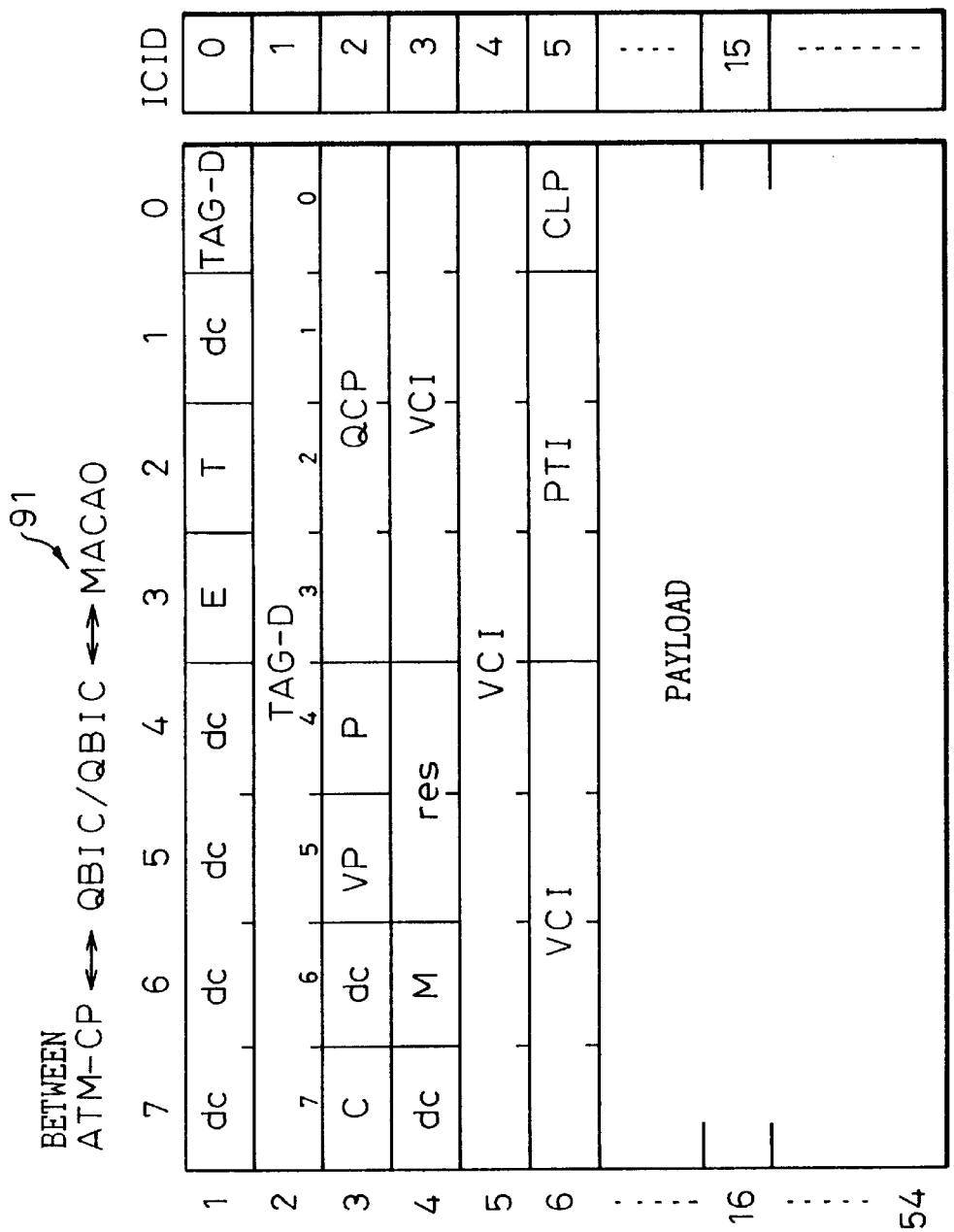
FIG. 21 is a view of an example of the format of testing cells transferred between the ATM-CP55 and a QBIC56 and between the QBIC56 and a MACAO57 in FIG. 17.

FIG. 21 is a view of an example of the format of testing cells transferred between the ATM-CP 55 and QBIC 56 and between the QBIC 56 and MACAO 57 in FIG. 17.

Figure 22:
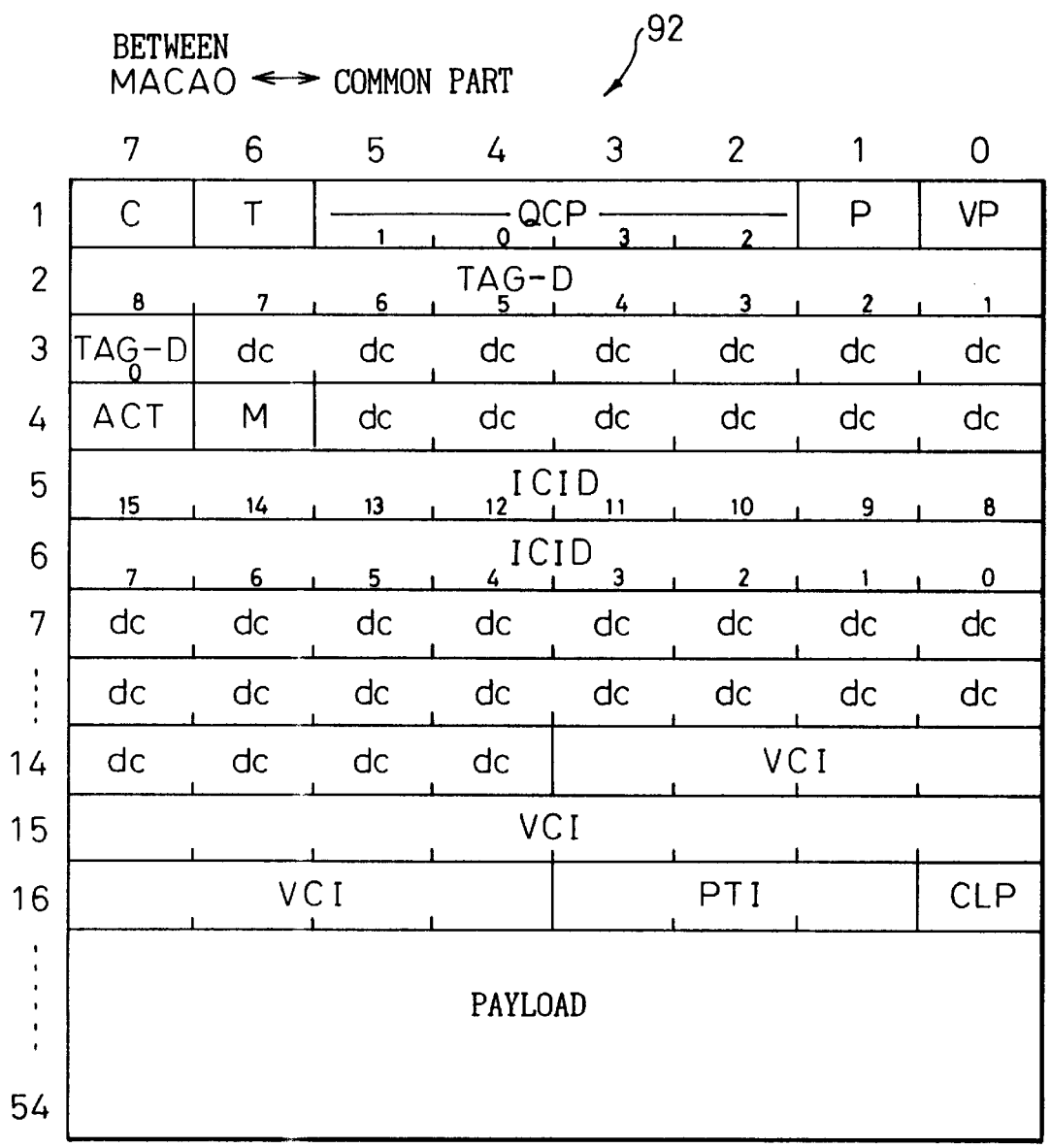
FIG. 22 is a view of an example of the format of the testing cells transferred between a common part 2 and the MACAO57 in FIG. 17.

FIG. 22 is a view of an example of the format of the testing cells transferred between the common part 2 and the MACAO 57 in FIG. 17. They are indicated as the testing cells 90, 91, and 92, respectively.

In FIG. 20, the testing cell 90 is composed by 54 octets as illustrated. The meanings of the symbols are as follows:

E: forced empty cell identifier;

T: testing cell identifier

TAG-D: port identifier;

VPI: virtual path identifier;

VCI: virtual channel identifier;

PTI: payload type identifier;

CLP: cell loss priority; and dc: "don't care".

The port identifier TAG-D designates the port (PORT) number in the highway SHW through the cell routing. This TAG-D is not fixedly allotted like the PORT number, but can be freely allotted by software.

The testing cell 91 of FIG. 21 has a configuration resembling that of the testing cell 90 of FIG. 20.

In FIG. 21, the meanings of the symbols not shown in FIG. 20 are as follows:

VP: VP/VC service identifier

P: priority class indication

QCP: quality control path;

M: discrimination of origination;

res: reserve bit; and

ICID: internal channel ID or connection identifier

The connection identifier ICID is given to the header of the cell so as to perform various processings of cells. As the ICIDs used in the system, there are the following ICIDs:

(a) ICID-A

This is the path identifier in a unit. There are an I-ICID-A managed uniquely (inherently) for the input side unit, and an O-ICID-A managed uniquely for the output side unit.

(b) ICID-B

This is the path identifier of a multicast cell and is managed uniquely for the system.

(c) ICID-C

This is the path identifier for leaf connection management of the logical multicast in the output side unit.

(d) ICID-D

This is the path identifier used in the common part 2 and performs the header conversion processing after once converting the I-ICID-A from the unit to the ICID-D. The ICID-D is managed uniquely for the common part.

The testing cell 92 of FIG. 22 has a configuration resembling that of the testing cells 90 and 91 of FIG. 20 and FIG. 21. The symbols shown only in FIG. 22 are:

C: multicast identifier; and

ACT: active cell identifier.

Figure 23:
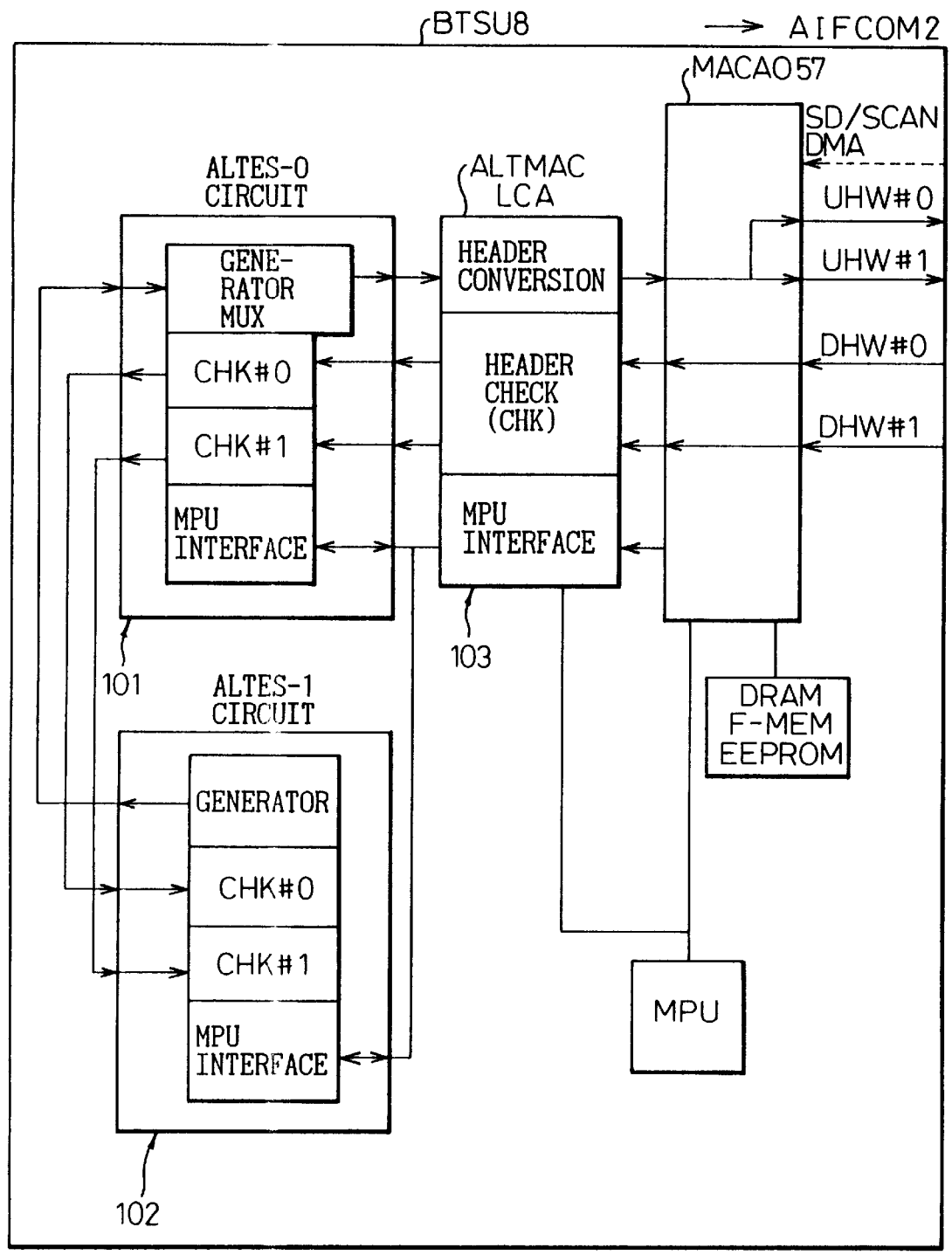
FIG. 23 is a block diagram of an example of the cell test equipment (BTSU) 8.

FIG. 23 is a block diagram of an example of the cell test equipment (BTSU) 8.

In the figure, the common part 2 is located on the right side from the MACAO 57. They are connected by a pair of upstream highways UHWs and a pair of downstream highways DHWs.

On the left side of the figure, an ALTES-0 circuit 101 and an ALTES-1 circuit 102 are provided. ALTES is an abbreviation for an "ATM layer test" and performs:

generation and sending of testing cells;

reception and verification of testing cells (for each of 0 side and 1 side); and SN check and PRBS check of received testing cells.

An ALTMAC-LCA 103 is arranged between the ALTES circuits 101 and 102 and the MACAO 57. ALTMAC-LCA is an abbreviation for an "ALTES macao (ATM layer test macao) interface" and has:

a function of converting the cell header; and a function of checking the cell header. "macao" is an abbreviation of a "microprocessor adapter and control highway handler for an ATM application object".

The testing cells are generated by generators in the ALTES-0 circuit and ALTES-1 circuit (101 and 102) and are sent to the common part 2 side. The testing cells returned to these circuits (101, 102) again are checked at check circuits (CHK#0 and CHK#1) in the same circuits. Since there are two ALTES circuits (101 and 102), two types of tests can be simultaneously executed.

Note that, in FIG. 23, F-MEM is a flash memory which stores a boot program and a control program.

Various test commands are issued from the cell test equipment (BTSU) 8. Examples thereof are as follows:

1) TST-ILOOP-RQ: Request for setting of individual part LOOP

2) TST-ICEL-CTL: Request for control of individual part cell counter

3) TST-IPCEL-RQ: Request for read out of number of cells passing through individual part 4) TST-BTSU-STR-RQ: Request for start of cell continuity test;

5) TST-BTSU-STA-RQ: Request for read out of cell continuity testing state;

6) TST-BTSU-END-RQ: Request for ending of cell continuity test;

7) TST-BTSU-CTE-RQ: Instruction for ending of continuous cell continuity test; and 8) CP-IVCC-SET: Request for setting IVCC.

The CP-IVCC-SET is an order for setting the value of the header of the testing cell. Namely, this is the order for setting the value of above-mentioned TAG-D or ICID-A.

An explanation will be made next of the return loop formed at the individual part 3 by referring once again to FIG. 18. This returning operation involves the cell counters (CNT) 74, 75, 76, and 77. The conditions of the cell counters when counting the returned cells are as follows:

CNT77: ICID-A+T bit;

CNT76: ICID-A+T bit;

CNT75: VPI/VCI/PTI+T bit+TAG-D; and

CNT74: VPI/VCI/PTI+T bit+TAG-D.

The firmware sets the cell counters 77/76 and 75/74 and provides the host with interfaces for control of filter/mask pattern setting, start+clear, stop, and reading. The host controls the counter required for tests with respect to the firmware. In general, when forming a loop at the confounding division, CNT77/76 is used, while CNT75/74 is used in cases other than this.

In order to realize the loop back, the firmware provides the following host interfaces. The host realizes the loop back by a combination of the present interfaces. In the following interfaces, the left side indicates the type of the interface, and the right side thereof indicates the function of each interface, respectively.

Loop point set and release: Set designated filter pattern and mask pattern at designated point. Conversely, release the loop point.

Counter control: Set designated filter pattern and mask pattern in the cell counter of the designated point. Activate counter of the designated point, clear, and stop.

Counter reading: Read out contents of counter of designated point.

T-bit control: Perform recovery of T-bit of designated ICID and control of release.

Both of the path setting means 11 shown in FIG. 2 and the spiral loop forming means 17 shown in FIG. 3 can be realized by path setting facilities. Note that this path setting mechanism per se is not novel and forms the core of a usual cell exchange 10.

Information important for the path setting mechanism are the TAGs added to the cells. Among them, TAG-D was already mentioned, therefore an explanation will be made below of the other TAG-A, TAG-B, TAG-C, and TAG-E.

1) TAG-A

During cell routing, TAG-A designates the numbers of the eight highways NHWs forming the outputs of the basic modules of the switching part 1. As this TAG-A, there are three types, that is, TAG-A1, TAG-A2, and TAG-A3, corresponding to the rows 1, 2, and 3.

2) TAG-B

In a cell routing, TAG-B designates the numbers of the 16 highway SHWs forming the outputs of the common part 2.

3) TAG-C

This indicates a multicast-use bit map of point-to-multipoint (PtMP) connection cells in the switching part 1.

4) TAG-E

In a cell routing, this indicates the number of the outgoing path of the high speed side in the wire concentrating unit in the common part 2. The number thereof can be set in units of VCs from the highway SHW.

By setting the above various TAGs, the testing cells can be made to run from one desired path (highway) to another desired path (highway).

Figure 24:
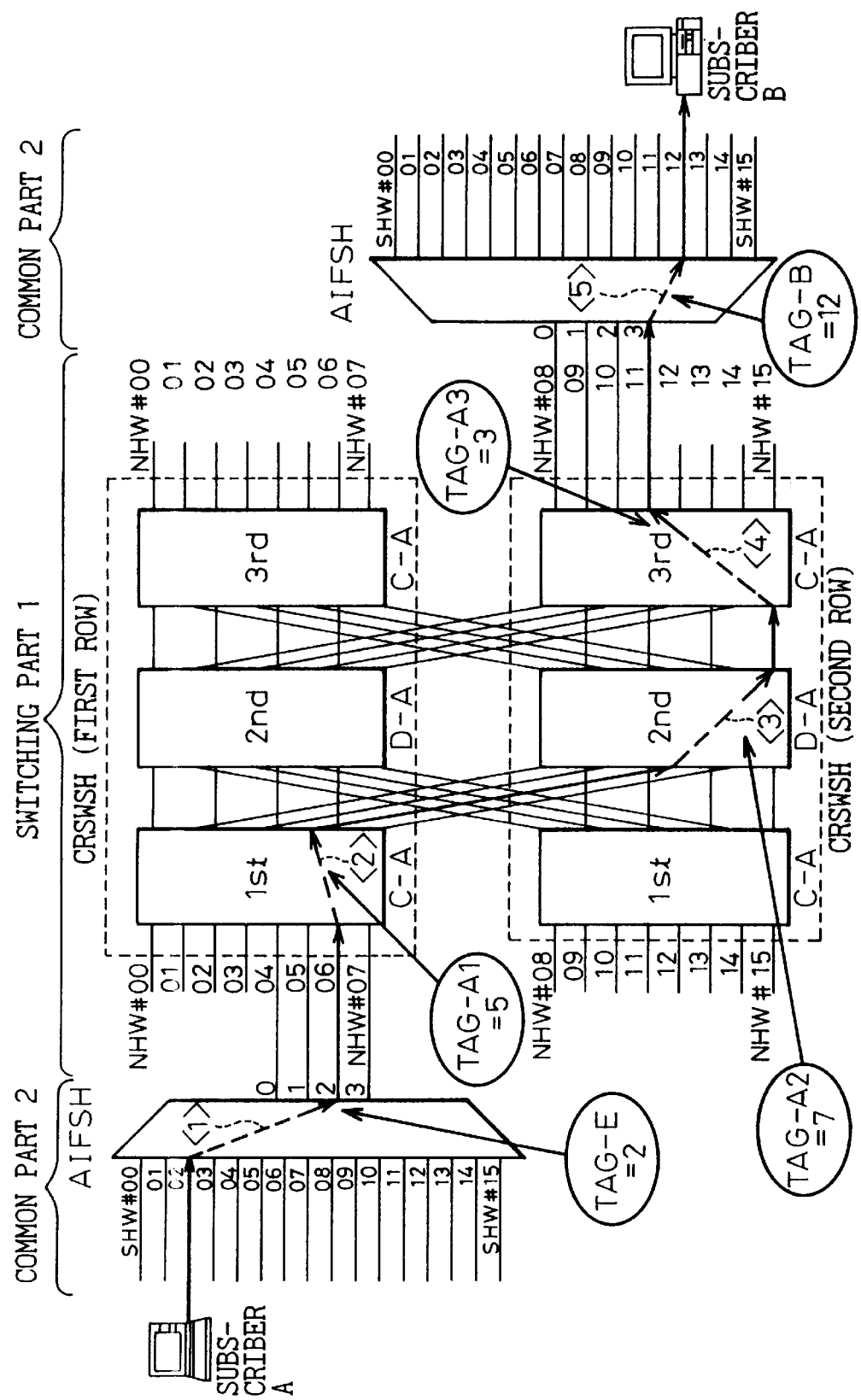
FIG. 24 is a view of the situation when a routing path of cells is freely set according to TAG in a readily understandable form.

FIG. 24 is a view of the situation when a routing path of cells is freely set according to TAG in a readily understandable form. The figure also shows an example of the switching pattern in the case of a point-to-point (PtP) connection. Note that this shows an example where one point is the subscriber A, the other point is the subscriber B, and a cell is routed in a switching part 1 of a 2-row 3-column structure.

The ALFSH indicated in the area of the common part 2 is an abbreviation of an "advanced interface shelf". Further, CRSWSH indicated in the area of the switching part 1 is an abbreviation of a "cell routing switch shelf".

FIG. 25 is a view of the general relationship between the location of switching of a cell and the value of the TAG. Cells are switched according to this relationship in the example of FIG. 24 as well. Namely, the path setting with respect to the testing cells is carried out while referring to the TAG information written in the headers of the testing cells.

During the routing of the cells, in addition to the TAG information, the already mentioned ICID information is also necessary. This will be explained with reference to FIG. 26.

Figure 26:
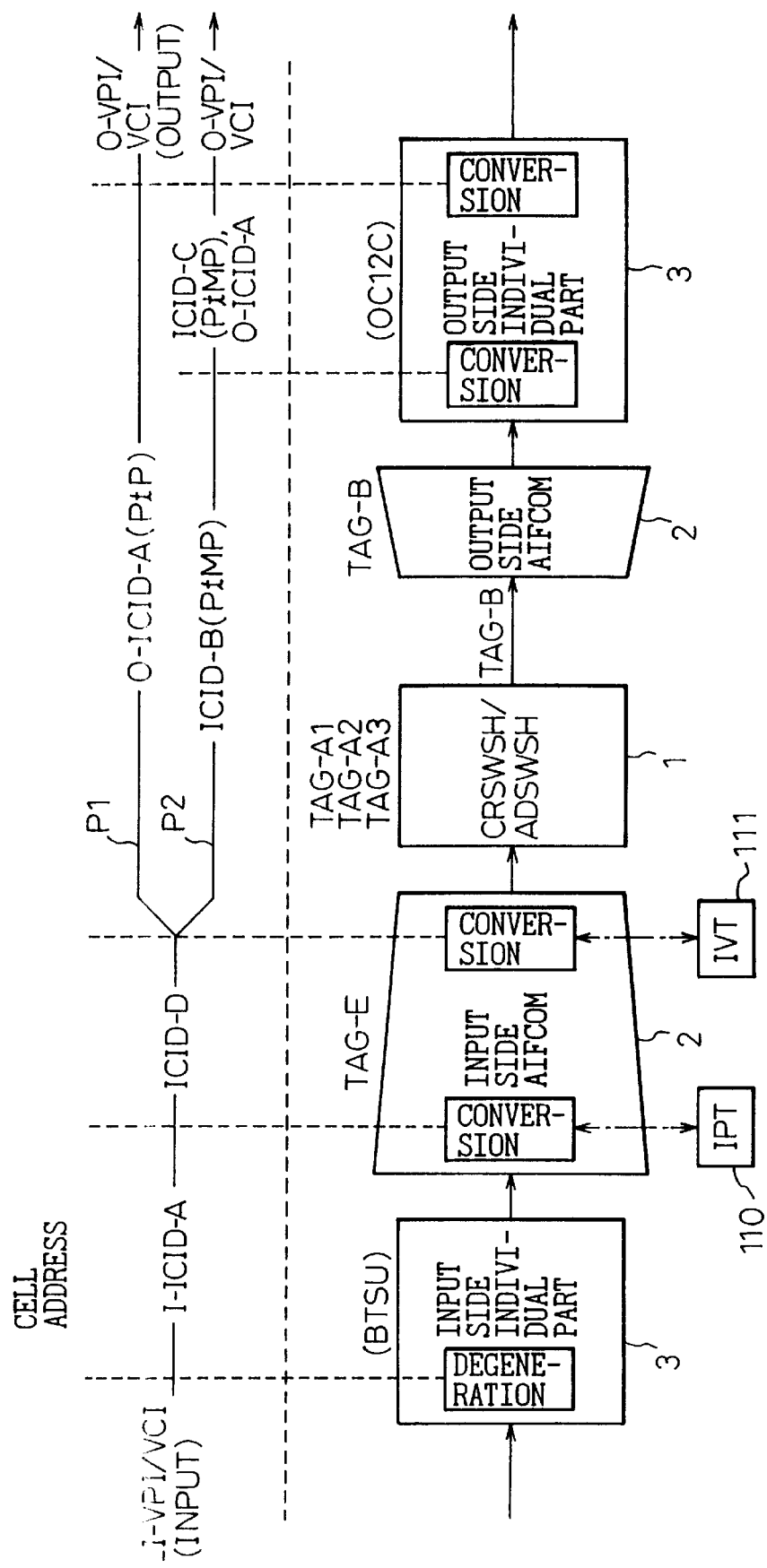
FIG. 26 is a view of the transitions of cell addresses in the cell exchange.

FIG. 26 is a view of a transition of the cell addresses in the cell exchange. In the figure, 3 shows an individual part. The input side individual part 3 (corresponding to BTSU 8) is shown at the left side of the figure, while the output side individual part 3 (corresponding to OC12C) is shown at the right side. Reference numeral 2 shows a common part. The input side common part 2 is shown at the left side of the figure, while the output side common part 2 is shown at the right side. These are located to the left and right of the switching part 1. Also the various TAGs shown in FIG. 25 are illustrated in the figure.

The input side common part 2 performs address conversions by referring to the IPT 110 and IVT 111. "IPT" is an abbreviation for an "incoming polled assign table", while "IVT" is an abbreviation for an "incoming VCC conversion table".

Further, in the upper portion of FIG. 26, from the left to right, the transitions of addresses (headers) are described corresponding to the units. Note that, P1 in the figure denotes the path in the point-to-point (PtP) case, while P2 denotes the path in the point-to-multipoint (PtMP) case. Only the path P1 is used in the execution of the cell diagnosis of continuity according to the present invention.

Cells with the address I-VPI/VCI written in their headers are converted to the address I-ICID-A at the input side individual part 3. However, when the input side individual part 3 acts as the BTSU 8, the testing cells are generated in this, so there is no I-VPI/VCI, and I-ICID-A is first written into the testing cell. Note that the "degenerating" unit in the input side individual part 3 is a part for converting the address for saving the capacity of the memory used.

A testing cell with the I-ICID-A written in its header is converted by the first "conversion" unit to a cell of the address ICID-D by referring to the IPT 110. Further, the ICID-D is converted by the second "conversion" unit to the address O-ICID-A by referring to IVT 111. A testing cell with this O-ICID-A written in its header is routed in the switching part 1 according to the TAG and further runs through the output side common unit 2 to reach the individual part 3 (OC12C) to be tested. Ordinary cells are further converted to cells of the address O-VPI/VCI at the "conversion" unit on the output side and sent to the subscriber side.

However, in the execution of the cell diagnosis of continuity according to the present invention, as explained in FIG. 18, the loop back of the testing cells is carried out in this output side individual part 3. Examples of concrete numbers for the I-ICID-A, ICID-D, and 0-ICID-A etc. are shown in FIG. 27.

Figure 27:
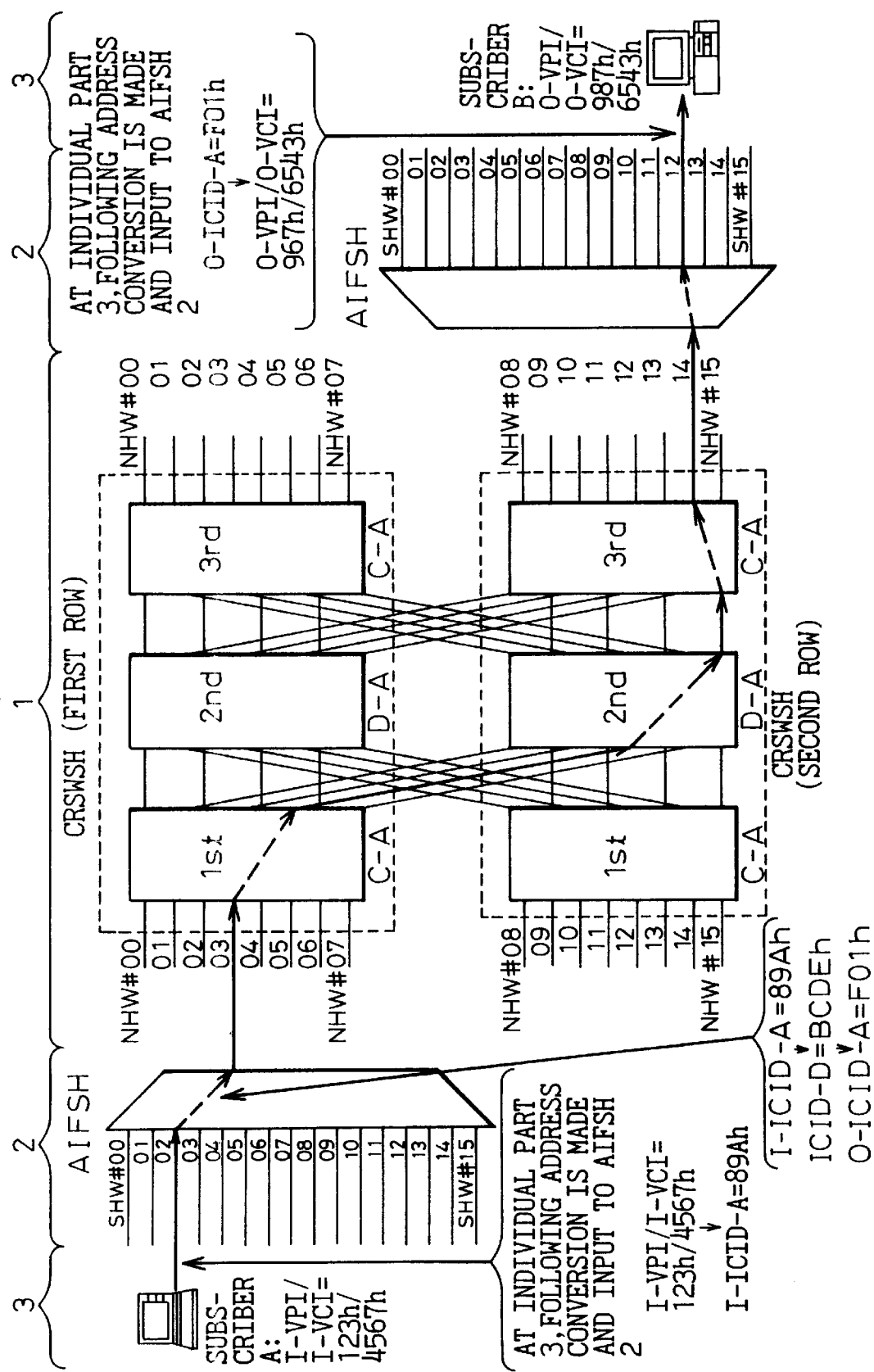
FIG. 27 is a view of a concrete example of the numerals of various addresses ICID.

FIG. 27 is a view of a concrete example of the numbers of the various addresses ICID. Note that the figure shows a case where cells are transferred from the subscriber A to the subscriber B similar to the case of FIG. 24. The transition of the address is as follows from the left to right in the figure:

I-VPI/I-VCI=123h/4567h
I-ICID-A=89Ah
ICID-D=BCDEh
O-ICID-A=F01h
O-VPI/O-VCI=967h/6543h

Figure 28:
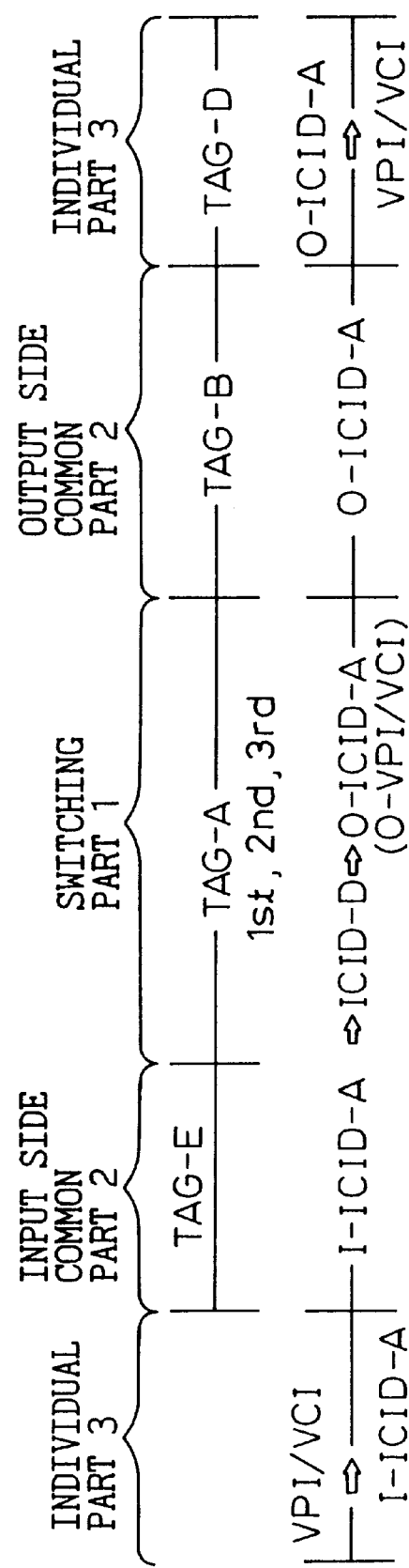
FIG. 28 is a view of the relation between the TAG and ICID in each unit of the cell exchange.

FIG. 28 is a view representing the relation of the TAG and ICID in units in the cell exchange.

A supplemental explanation will be finally given of the path setting. First, when looking at the first aspect of the invention shown in FIG. 14, the transitions of TAG-E, TAG-A, and TAG-B become as those in the following Table 1. Note, for simplification, only two BTSUs 8 (BTSU-0 and BTSU-1) are used. Further, it is assumed that the testing cells from the BTSU-0 reach the input side common part 2 (1)(TAG-E) by using the highway SHW=5 and further reach the switching part 1 (TAG-A) by using the highway NHW=0 and further reach the output side common part 2 by using the highway NHW=5 and reach the individual part 3 by using the highway SHW=3 (TAG-B). On the other hand, it is assumed that the testing cells from the BTSU-1 reach the input side common part 2 (2)(TAG-E) by using the highway SHW=3, further reach the switching part 1 (TAG-A) by using the highway NHW=1, and further reach the output side common part 2 by using the highway NHW=5 and reach the individual part 3 by using the highway SHW=3 (TAG-B).

TABLE 1

|  | TAG-E | TAG-A | TAG-B |
| --- | --- | --- | --- |
| BTSU-0 | 0 | 5 | 3 |
| BTSU-1 | 1 | 5 | 3 |

Next, when viewing the second aspect of the invention shown in FIG. 4, the transitions of TAG-E, TAG-A, and TAG-B are shown in the following Table 2. Note that the testing cells from the BTSU 8, <1> reach the input side common part 2 (TAG-E) by using the highway SHW=1, further reach the switching part 1 (TAG-A) by using the highway NHW=3, and further reach the output side common part 2 (TAG-B) by using the highway NHW=5 and further reach the individual part 3 by using the highway SHW=1. Further, it is assumed that, <2> by forming the first return loop in the switching part 1, the cells return to the individual part 3 where they are turned back, <3> by forming a second return loop in the switching part 1, the cells return to the individual part 3 where they are turned back, <4> by forming a third return loop in the switching part 1, the cells return to the individual part 3 where they are turned back, and <5> return to BTSU 8 (TAG-E).

TABLE 2

|  | TAG-E | TAG-A | TAG-B |
| --- | --- | --- | --- |
| <1> | 3 | 5 | 1 |
| <2> | 1 | 5 | 1 |
| <3> | 1 | 5 | 1 |
| <4> | 1 | 5 | 1 |
| <5> | 1 | 3 | 1 |

As explained above, according to the present invention, irrespective of a fact that the maximum cell feeding speed is low, i.e., for example 156 Mbps, cell diagnosis of continuity can be carried out for a broad band cell exchange provided with individual parts with a high maximum operating band width for handling for example 622 Mbps speeds by using ordinary cell test equipment (BTSU) which has been already put into practical use.

What is claimed is:

1. A method of cell diagnosis of continuity for one specified unit among various units constituting a cell exchange by cell test equipment, comprising:

a step of setting a plurality of paths between a diagnosed unit and said cell test equipment in said cell exchange;

a step of concentrating cells sent from at least one of said cell test equipment through said plurality of paths simultaneously at said diagnosed unit by multiplexing said cells sent through said plurality of paths; and a step of returning said cells concentrated at said diagnosed unit via one of said plurality of paths to said cell test equipment.

2. A method of cell diagnosis of continuity according to claim 1, wherein at least two units of said cell test equipment are provided and cells are simultaneously sent from all of the cell test equipment to said diagnosed unit via said paths and concentrated at the diagnosed unit.

3. A method of cell diagnosis of continuity according to claim 2, wherein a forward path and a backward path returned at said diagnosed unit are individually set by each of said at least two units of cell test equipment.

4. A method of cell diagnosis of continuity according to claim 2, wherein when the maximum operating band width of said diagnosed unit is "M" bps and the maximum cell feeding speed of each unit of said cell test equipment is "N" bps (M>N), M/N number of units of cell test equipment are used.

5. A method of cell diagnosis of continuity according to claim 2, wherein the returning point in the diagnosed unit when returning said cells concentrated at said diagnosed unit to said cell test equipment is formed on a side nearer the outgoing path of the diagnosed unit.

6. A method of cell diagnosis of continuity according to claim 1, wherein said diagnosis by said cell test equipment is carried out by a single unit of cell test equipment.

7. A method of cell diagnosis of continuity according to claim 6, wherein said plurality of path routes are set so that cell trains are transferred along a spiral loop in said cell exchange while passing through said diagnosed unit plurality of times.

8. A method of cell diagnosis of continuity according to claim 7, wherein a single cell train is sent from said single unit of cell test equipment for exactly a predetermined time so that cell trains on each forward path to said diagnosed unit transferred along said spiral loop are concentrated simultaneously at the diagnosed unit in a predetermined concentrating time.

9. A method of cell diagnosis of continuity according to claim 8, wherein the number of said forward paths is M/N when the maximum operating band width of said diagnosed unit is "M" bps and the maximum cell feeding speed of said single unit of cell test equipment is "N" bps (M>N) and wherein the total number of said plurality of paths, adding the backward path, is M/N+1.

10. A method of cell diagnosis of continuity according to claim 8, wherein said predetermined sending time Ts is determined so that the trail of the top cell train passing through said diagnosed unit first among said cell trains transferred on each said forward path appears later on the time axis than the head of the final cell train passing through the diagnosed unit last among the cell trains transferred on each said forward path.

11. A method of cell diagnosis of continuity according to claim 10, wherein, when said predetermined concentrating time is set to Tc, said predetermined sending time Ts is determined so that a time difference between a time when the head of said final cell train appears and a time when the trail of said top cell train appears becomes said predetermined concentrating time Tc.

12. A method of cell diagnosis of continuity according to claim 8, wherein, when the testing time by said single unit of cell test equipment is set, said predetermined concentrating time Tc is set by the testing time.

13. A method of cell diagnosis of continuity according to claim 8, wherein the path is repeatedly switched from said forward path of a preceding stage to said forward path of a following stage by rewriting tag information added to the header part of said cell trains in said diagnosed unit.

14. A method of cell diagnosis of continuity according to claim 8, wherein a return loop for switching from said forward path of a preceding stage to said forward path of a following stage is formed on the side nearer the outgoing path of said diagnosed unit.

15. A system for cell diagnosis of continuity comprising:

a plurality of units of cell test equipment for sending cells for executing cell diagnosis of continuity with respect to one specified unit among the various units constituting the cell exchange;

a plurality of path setting means provided corresponding to the units of the cell test equipment for forming, in said cell exchange, paths leading cells sent from said units of cell test equipment to diagnosed unit; and a return loop forming means provided in the diagnosed unit for returning said cells led to said paths and concentrated to said diagnosed unit toward said units of cell test equipment via the path in said cell exchange.

16. A system for cell diagnosis of continuity comprising:

a single unit of cell test equipment for sending cells for executing the cell diagnosis of continuity with respect to one specified unit among various units constituting the cell exchange;

a path setting means provided for forming, in said cell exchange, a path leading cells sent from said single unit of cell test equipment to said diagnosed unit;

a return loop forming means provided in the diagnosed unit for returning said cells from said path at said diagnosed unit; and a spiral loop forming means for setting, in said cell exchange, a path for repeatedly returning said cells returned at said return loop forming means to said diagnosed unit so as to form a spiral loop.

17. A recording medium storing a program for enabling a computer to execute cell diagnosis of continuity with respect to one specified unit among the various units constituting a cell exchange via cell test equipment, said program comprising setting a plurality of paths between said diagnosed unit and said cell test equipment in said cell exchange;

making the cells sent from at least one said cell test equipment through said plurality of paths almost simultaneously concentrate at said diagnosed unit; and returning said cells concentrated at said diagnosed unit to said cell test equipment via one of said plurality of paths.

* * * * *